United States Patent
Li et al.

(10) Patent No.: US 12,174,352 B2
(45) Date of Patent: Dec. 24, 2024

(54) IMAGING SYSTEM

(71) Applicant: ZHEJIANG SUNNY OPTICS CO., LTD., Zhejiang (CN)

(72) Inventors: Yanping Li, Zhejiang (CN); Lingbo He, Zhejiang (CN); Lin Huang, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 482 days.

(21) Appl. No.: 17/718,355

(22) Filed: Apr. 12, 2022

(65) Prior Publication Data

US 2022/0342185 A1  Oct. 27, 2022

(30) Foreign Application Priority Data

Apr. 14, 2021  (CN) .......................... 202110400295.1

(51) Int. Cl.
  *G02B 9/64* (2006.01)
  *G02B 13/00* (2006.01)

(52) U.S. Cl.
  CPC .......... *G02B 13/0045* (2013.01); *G02B 9/64* (2013.01)

(58) Field of Classification Search
  CPC ............................. G02B 13/0045; G02B 9/64
  USPC ........................................................ 359/755
  See application file for complete search history.

(56) References Cited

U.S. PATENT DOCUMENTS

| | | | |
|---|---|---|---|
| 10,025,064 B2* | 7/2018 | Nakanuma | G02B 13/0015 |
| 10,656,387 B2* | 5/2020 | Kubota | G02B 13/0045 |
| 11,513,319 B2* | 11/2022 | Nitta | G02B 13/18 |
| 2015/0362699 A1* | 12/2015 | Nakanuma | G02B 13/0015 348/360 |
| 2016/0085054 A1 | 3/2016 | Asami | |
| 2017/0351067 A1* | 12/2017 | Kubota | G02B 13/0045 |
| 2019/0079272 A1* | 3/2019 | Kubota | G02B 13/0045 |
| 2021/0088755 A1* | 3/2021 | Nitta | G02B 27/0025 |
| 2021/0199933 A1* | 7/2021 | Wang | G02B 13/18 |
| 2021/0255428 A1* | 8/2021 | Lin | G02B 13/04 |
| 2021/0255429 A1* | 8/2021 | Lin | G02B 13/0045 |
| 2021/0373298 A1* | 12/2021 | Tseng | G02B 13/0045 |

FOREIGN PATENT DOCUMENTS

| | | |
|---|---|---|
| CN | 208334761 A | 1/2019 |
| CN | 110989146 A | 4/2020 |
| CN | 112596215 A | 4/2021 |
| JP | 2001290076 A | 10/2001 |

OTHER PUBLICATIONS

Corresponding CN search issued on Jun. 21, 2022.

* cited by examiner

*Primary Examiner* — William R Alexander
(74) *Attorney, Agent, or Firm* — Samson G. Yu

(57) ABSTRACT

The disclosure relates to an imaging system, including a first lens, a second lens, a third lens, a diaphragm, a fourth lens, a fifth lens, a sixth lens and a seventh lens arranged in sequence from an object side to an image side along an optical axis, wherein the first lens, the second lens, the third lens and the sixth lens all have refractive powers, the fourth lens has a negative refractive power, the fifth lens has a positive refractive power, and the seventh lens has a negative refractive power. The imaging system of the disclosure has excellent characteristics such as ultra-wide angle, thereby being able to satisfy more photography demands.

18 Claims, 12 Drawing Sheets longitudinal aberration curve (millimeter)

longitudinal aberration curve

IMAGING SYSTEM

CROSS-REFERENCE TO RELATED APPLICATION

The disclosure claims priority to and the benefit of Chinese Patent Application No. 202110400295.1, filed to the China National Intellectual Property Administration (CHIPA) on 14 Apr. 2021, which is hereby incorporated by reference in its entirety.

TECHNICAL FIELD

The disclosure relates to the technical field of the optical imaging, and in particular to an imaging system.

BACKGROUND

With the rapid development of smart phones, camera innovation has become the top priority in innovative technologies. Its innovation direction mainly includes the following points: 1. gradual penetration of high pixels; 2. gradual penetration of Video camera shooting; 3. potential outbreak of TOF; 4. rapid growth of front dual cameras; 5. further penetration of rear four cameras; and 6. technological breakthrough of under-screen cameras. These innovations all belong to the development trend of smart phone camera technology in the future.

As a member of current multi-camera imaging lenses, a wide-angle lens is widely used in large-scale landscape photography works because of its numerous advantages.

Specifically, the wide-angle lens has a large viewing angle and a wide field of view, and the range of a scene observed from a certain viewpoint is much greater than that seen by human eyes at the same viewpoint; the depth of field is long, so that a considerable clear range can be expressed; and a perspective effect of a picture can be emphasized, and it is good at exaggerating foregrounds and expressing the distance sensing of the scene, which is conducive to enhancing the appeal of the picture.

With the continuous development of portable electronic products such as smart phones, higher requirements are proposed for the imaging lenses, wide-angle lenses of about 120 degrees are utilized in most prior arts, and after the correction of a distortion algorithm, the FOV is about 110 degrees, which cannot satisfy greater demands of future technologies for wide-angle shooting of mobile phones.

SUMMARY

The purpose of the disclosure is to provide an imaging system, so as to solve the above problems.

In order to achieve the above purpose, the disclosure provides an imaging system, which includes a first lens, a second lens, a third lens, a diaphragm, a fourth lens, a fifth lens, a sixth lens and a seventh lens arranged in sequence from an object side to an image side along an optical axis, wherein the first lens, the second lens, the third lens and the sixth lens all have refractive powers, the fourth lens has a negative refractive power, the fifth lens has a positive refractive power, and the seventh lens has a negative refractive power.

In an implementation mode, an object-side surface of the fifth lens is a concave surface.

In an implementation mode, Semi-FOV is a half of a maximum field of view of the imaging system, and Semi-FOV satisfies: Semi-FOV>70°.

In an implementation mode, an object-side surface of the first lens is a plane.

In an implementation mode, a lens material in the imaging system includes glass and plastic.

In an implementation mode, TTL is an on-axis distance between an object-side surface of the first lens and an imaging surface, ImgH is a half of a diagonal length of an effective pixel region on the imaging surface, and TTL and ImgH satisfy: TTL/ImgH<1.6.

In an implementation mode, an effective focal length f of the imaging system and an entrance pupil diameter (EPD) of the imaging system satisfy: f/EPD<2.5.

In an implementation mode, ImgH is a half of a diagonal length of an effective pixel region on an imaging surface, and ImgH satisfies: ImgH≥5.0 mm.

In an implementation mode, an effective focal length f1 of the first lens and a curvature radius R2 of an image-side surface of the first lens satisfy: −2.5<f1/R2<−1.5.

In an implementation mode, an effective focal length f3 of the third lens and a curvature radius R5 of an object-side surface of the third lens satisfy: 1.5<f3/R5<2.0.

In an implementation mode, an effective focal length f5 of the fifth lens and a curvature radius R9 of an object-side surface of the fifth lens satisfy: −3.5<R9/f5<−2.0.

In an implementation mode, an effective focal length f7 of the seventh lens and a curvature radius R13 of an object-side surface of the seventh lens satisfy: −3.0<f7/R13<−1.5.

In an implementation mode, a curvature radius R8 of an image-side surface of the fourth lens, a curvature radius R11 of an object-side surface of the sixth lens and a curvature radius R14 of an image-side surface of the seventh lens satisfy: 1.5<R8/(R11+R14)<5.5.

In an implementation mode, a curvature radius R10 of an image-side surface of the fifth lens and a curvature radius R12 of an image-side surface of the sixth lens satisfy: −1.5<R12/R10<−0.5.

In an implementation mode, ΣCT is a sum of center thicknesses of all lenses on the optical axis, ΣCT and an air space T67 of the sixth lens and the seventh lens on the optical axis satisfy: 1.5<ΣCT/T67<2.0.

In an implementation mode, TTL is an on-axis distance between an object-side surface of the first lens and an imaging surface, ΣAT is a sum of the air spaces between the first lens and any two adjacent lenses with refractive powers in the lenses closest to the imaging surface on the optical axis, and TTL and ΣAT satisfy: 2.0<TTU/ΣAT<2.5.

In an implementation mode, a refractive index N1 of the first lens satisfies: N1<1.5.

In an implementation mode, an Abbe number V1 of the first lens satisfies: 60<V1<71.

In an implementation mode, an Abbe number V1 of the first lens and an Abbe number V2 of the second lens satisfy: V1−V2<52.

In an implementation mode, an ultra-wide-angle optical imaging system composed of seven lenses is provided, Semi-FOV of which is greater than 70 degrees, after distortion correction, a maximum field of view (FOV) is greater than a conventional wide-angle field of view, and thus may satisfy more photography demands. At the same time, the first lens with the refractive power is made of a glass material, which may achieve an effect of correcting chromatic aberration while enhancing the hardness.

In an implementation mode, by means of a cooperation of the first lens with the refractive power and the second lens with the refractive power, it is beneficial to increasing a field of view, reducing a pupil aberration, and improving an imaging quality, so that the first lens and the second lens undertake the refractive powers required by the imaging system. By means of a cooperation of the third lens with the refractive power and the fourth lens with the negative refractive power, it is beneficial to reducing a coma and astigmatism of the imaging system, and at the same time, it is also beneficial to compressing an incident angle of light at a diaphragm position and better controlling a shape and a size of distortion. The fifth lens has the positive refractive power, and an object-side surface thereof is a concave surface, therefore good imaging quality and loose processing characteristics of a large-aperture imaging system with a compact structure are realized. By means of a cooperation of the sixth lens with the refractive power and the seventh lens with the negative refractive power, a spherical aberration contribution of the two optical members may be reasonably controlled within a reasonable level, so that good imaging quality is obtained in an on-axis field of view.

In an implementation mode, since an object-side surface of the first lens of the imaging system is a plane, an aperture size of the first lens may be effectively reduced, which is beneficial to structure layout. In addition, a lens group in the imaging system is composed of glass lenses and plastic lenses, this manner of mixing glass with plastic may not only make the imaging system thinner so as to conform to the current trend of lightness and thickness, but may also eliminate thermal difference and improve the imaging quality of the lenses. Glass-plastic mixed high-end mobile phone lenses may reach higher image-text standards, thus satisfying higher demands for image-text pixels in the 5G era.

In an implementation mode, Semi-FOV is a half of a maximum field of view of the imaging system, and Semi-FOV is controlled to be greater than 70 degrees, so that a wide-angle characteristic of the imaging system may be guaranteed.

In an implementation mode, by controlling a ratio of an on-axis distance between an object-side surface of the first lens and an imaging surface to the half the diagonal length of the effective pixel region on the imaging surface, a characteristic of compact structure of the imaging system may be guaranteed.

In an implementation mode, by controlling a ratio of an F-number of a camera lens group to an entrance pupil diameter of the imaging system, a characteristic of the aperture of the imaging system may be guaranteed, such that a depth of field is shallower, which is conducive to highlighting a subject and simplifying a picture.

In an implementation mode, by controlling a value of a half of a diagonal length of an effective pixel region on an imaging surface, a characteristic of a large image surface of the imaging system may be guaranteed, and higher imaging quality may be obtained.

In an implementation mode, by controlling a ratio of an effective focal length of the first lens to a curvature radius of an image-side surface of the first lens to be less than zero, the refractive power of the first lens may be effectively controlled within a reasonable range, so that the first lens may not only undertake the refractive power required by the imaging system, but may also make spherical aberration contributed by it within a reasonable and controllable range, thereby guaranteeing that a subsequent imaging system may reasonably correct a negative spherical aberration contributed by it, and making an image quality in an on-axis field of view better guaranteed.

In an implementation mode, by controlling a ratio of an effective focal length of the third lens to a curvature radius of an image-side surface of the third lens to be greater than zero, the refractive power of the third lens may be effectively controlled within a reasonable range, so that the third lens may not only undertake the positive refractive power required by the imaging system, but may also reasonably control its contribution rate to positive spherical aberration, and accordingly, the third lens may balance the negative refractive power of the first lens.

In an implementation mode, by controlling an effective focal length of the fifth lens and a curvature radius of an object-side surface of the fifth lens, a contribution rate of the fifth lens to spherical aberration and astigmatism may be controlled to a certain extent, and then the amount of astigmatism and spherical aberration produced by optical lenses on the front end and the rear end are balanced, such that the imaging system has good imaging quality.

In an implementation mode, by controlling a ratio of a curvature radius of an image-side surface of the seventh lens to a sum of a curvature radius of an object-side surface of the sixth lens and a curvature radius of an image-side surface of the seventh lens, shapes of the fourth lens, the sixth lens and the seventh lens may be effectively controlled, so that the imaging system satisfies a suitable assembly segment gap, which is beneficial to moulding and assembly.

In an implementation mode, by controlling a ratio of a curvature radius of an image-side surface of the fourth lens to a sum of a curvature radius of an object-side surface of the sixth lens and a curvature radius of an image-side surface of the seventh lens, a thickness ratio trend of aspheric surfaces of the fourth lens, the sixth lens and the seventh lens may be effectively controlled, so as to fall into an easy-to-process section.

In an implementation mode, by defining a range of a ratio of a curvature radius of an image-side surface of the fifth lens to a curvature radius of an image-side surface of the sixth lens, an air space between the fifth lens and the sixth lens may be well controlled, so that surface shapes of the two lenses may have a certain complementary effect.

In an implementation mode, by controlling a ratio of a sum of center thicknesses of all lenses on an optical axis to an air space between the sixth lens and the seventh lens on the optical axis, a position occupied by the sixth lens and the seventh lens in the entire lens group may be effectively controlled, such that the lenses are evenly arranged, which is convenient for moulding and assembly.

In an implementation mode, by controlling a ratio of an on-axis distance between an object-side surface of the first lens and an imaging surface to a sum of air spaces between the first lens and any two adjacent lenses with refractive powers in the lenses closest to the imaging surface on the optical axis, a spacing between each lens may be effectively controlled, so that the imaging system is evenly distributed, and better air gap sensitivity may be obtained, which is beneficial to improving a yield of the imaging system.

In an implementation mode, by controlling a refractive index of the first lens to be less than 1.5, it may be guaranteed that the first lens uses a low-refractive material, which saves costs.

In an implementation mode, by controlling an Abbe number of the first lens, the first lens may effectively improve a chromatic dispersion of the imaging system, so that the imaging system may obtain better imaging quality.

In an implementation mode, by controlling a ratio of Abbe numbers of the first lens and the second lens, the first lens and the second lens may be effectively used to improve a chromatic dispersion of the imaging system, so that the imaging system may obtain better imaging quality.

DETAILED DESCRIPTION OF THE EMBODIMENTS

To illustrate technical solutions in the embodiments of the disclosure or in the prior art more clearly, a brief introduction on the drawings which are needed in the description of the embodiments is given below. Apparently, the drawings in the description below are merely some of the embodiments of the disclosure, based on which other drawings can be obtained by those of ordinary skill in the art without any creative effort.

When embodiments of the disclosure are described, orientation or position relationships expressed by terms such as "longitudinal", "transverse", "upper", "lower", "front", "rear", "left", "right", "vertical", "horizontal", "top", "bottom", "inside" and "outside" are orientation or position relationships shown on the basis of the drawings, and are merely for the convenience of describing the disclosure and simplifying the description, rather than indicating or implying that the referred apparatuses or elements must have specific orientations or must be constructed and operated in specific orientations, and thus the above terms cannot be construed as limitations to the disclosure.

The disclosure will be described in detail below with reference to the drawings and specific embodiments. The embodiments cannot be repeated here one by one, but the embodiments of the disclosure are not limited to the following embodiments.

Figure 1:
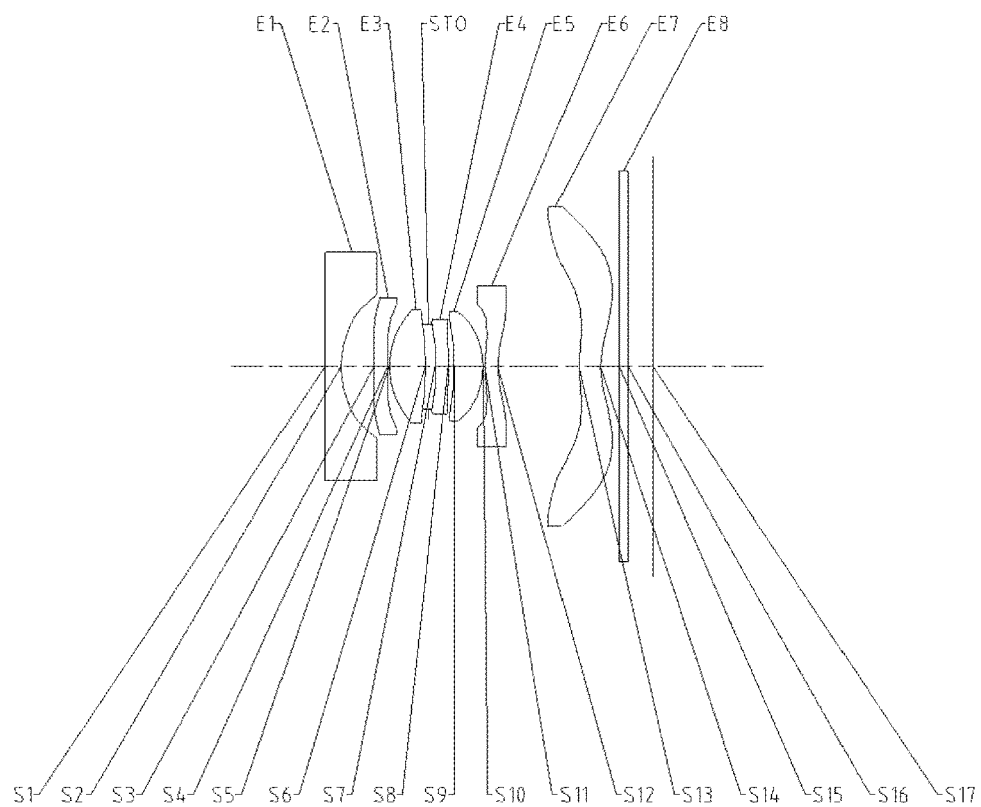
FIG. 1 schematically shows a structural diagram of an imaging system according to a first embodiment of the disclosure.

As shown in FIG. 1, an imaging system of the disclosure includes a first lens E1, a second lens E2, a third lens E3, a diaphragm STO, a fourth lens E4, a fifth lens E5, a sixth lens E6 and a seventh lens E7 arranged in sequence from an object side to an image side along an optical axis, wherein the first lens E1, the second lens E2, the third lens E3 and the sixth lens E6 all have refractive powers. Thus, the first lens E1 and the second lens E2 with refractive powers are beneficial to increasing a field of view, reducing a pupil aberration and improving an imaging quality, so that the first lens and the second lens undertake the refractive powers required by the imaging system. According to a concept of the disclosure, the fourth lens E4 has a negative refractive power and cooperates with the third lens E3 with the refractive power, thereby being beneficial to reducing a coma and astigmatism of the imaging system, and meanwhile, being also beneficial to compressing an incident angle of light at a diaphragm position and better controlling a shape and a size of distortion. The fifth lens E5 has a positive refractive power, and an object-side surface thereof is a concave surface, therefore good imaging quality and loose processing characteristics of a large-aperture imaging system with a compact structure are realized. The seventh lens E7 has a negative refractive power and cooperates with the sixth lens E6 with the refractive power, so that a spherical aberration contribution of the two optical members may be reasonably controlled within a reasonable level, and then good imaging quality is obtained in an on-axis field of view. In addition, Semi-FOV is a half of a maximum field of view of the imaging system of the disclosure, and Semi-FOV satisfies: Semi-FOV>70°. In this way, by controlling a value of the half of the maximum field of view of the imaging system, a wide-angle characteristic of the imaging system may be guaranteed.

In an exemplary embodiment, an object-side surface of the first lens E1 is a plane. In this way, a aperture size of the first lens may be effectively reduced, which is beneficial to structure layout. A lens material in the imaging system includes glass and plastic. In this way, the imaging system includes glass lenses and plastic lenses, this manner of mixing glass with plastic may not only make the imaging system thinner so as to conform to a current trend of lightness and thickness, but may also eliminate thermal difference and improve an imaging quality of the lenses. Glass-plastic mixed lenses may reach higher image-text standards, thus satisfying higher demands for image-text pixels.

In an exemplary embodiment, TTL is an on-axis distance between an object-side surface of the first lens E1 and an imaging surface, ImgH is a half of a diagonal length of an effective pixel region on the imaging surface, and TTL and ImgH satisfy: TTL/ImgH<1.6. By controlling a ratio of the on-axis distance between the object-side surface of the first lens E1 and the imaging surface to the half the diagonal length of the effective pixel region on the imaging surface, a characteristic of compact structure of the imaging system may be guaranteed. An effective focal length f of the imaging system and an entrance pupil diameter (EPD) of the imaging system satisfy: f/EPD<2.5. By controlling an F-number of the imaging system, a characteristic of a aperture of the imaging system may be effectively guaranteed, such that a depth of field is shallower, which is conducive to highlighting a subject and simplifying a picture. ImgH satisfies: ImgH≥5.0 mm. By controlling the half of the diagonal length of the effective pixel region on the imaging surface, a characteristic of a large image surface of the imaging system may be guaranteed, and higher imaging quality may be obtained.

In an exemplary embodiment, an effective focal length f1 of the first lens E1 and a curvature radius R2 of an image-side surface of the first lens E1 satisfy: −2.5<f1/R2<−1.5. By controlling a ratio of the effective focal length of the first lens to the curvature radius of the image-side surface of the first lens to be less than zero, the refractive power of the first lens may be effectively controlled within a reasonable range, so that the first lens may not only undertake the refractive power required by the imaging system, but may also make spherical aberration contributed by it within a reasonable and controllable range, thereby guaranteeing that a subsequent imaging system may reasonably correct a negative spherical aberration contributed by it, and making the image quality in the on-axis field of view better guaranteed. An effective focal length f3 of the third lens E3 and a curvature radius R5 of an object-side surface of the third lens E3 satisfy: 1.5<f3/R5<2.0. By controlling a ratio of the effective focal length of the third lens to the curvature radius of the image-side surface of the third lens to be greater than zero, the refractive power of the third lens may be effectively controlled within a reasonable range, so that the third lens not only undertakes the positive refractive power required by the imaging system, but also reasonably controls its contribution rate to positive spherical aberration, and accordingly, the third lens may balance the negative refractive power of the first lens.

In an exemplary embodiment, an effective focal length f5 of the fifth lens E5 and a curvature radius R9 of an object-side surface of the fifth lens E5 satisfy: −3.5<R9/f5<−2.0. By controlling the effective focal length of the fifth lens and the curvature radius of the object-side surface of the fifth lens, a contribution rate of the fifth lens to spherical aberration and astigmatism may be controlled to a certain extent, and then the amount of astigmatism and spherical aberration produced by optical lenses on the front end and the rear end are balanced, such that the imaging system has good imaging quality. An effective focal length U of the seventh lens E7 and a curvature radius R13 of an object-side surface of the seventh lens E7 satisfy: −3.0<f7/R13<−1.5. By controlling a ratio of the curvature radius of the image-side surface of the seventh lens to a sum of the curvature radius of the object-side surface of the sixth lens and the curvature radius of the image-side surface of the seventh lens, the shapes of the fourth lens E4, the sixth lens E6 and the seventh lens E7 may be effectively controlled, so that the imaging system satisfies a suitable assembly segment gap, which is beneficial to moulding and assembly. A curvature radius R8 of an image-side surface of the fourth lens E4, a curvature radius R11 of an object-side surface of the sixth lens E6 and a curvature radius R14 of an image-side surface of the seventh lens E7 satisfy: 1.5<R8/(R11+R14)<5.5. By controlling a ratio of the curvature radius of the image-side surface of the fourth lens to a sum of the curvature radius of the object-side surface of the sixth lens and the curvature radius of the image-side surface of the seventh lens, a thickness ratio trend of aspheric surfaces of the fourth lens, the sixth lens and the seventh lens may be effectively controlled, so as to fall into an easy-to-process section. A curvature radius R10 of an image-side surface of the fifth lens E5 and a curvature radius R12 of an image-side surface of the sixth lens E6 satisfy: −1.5<R12/R10<−0.5. By defining a range of a ratio of the curvature radius of the image-side surface of the fifth lens to the curvature radius of the image-side surface of the sixth lens, an air space between the fifth lens E5 and the sixth lens E6 may be well controlled, so that surface shapes of the two lenses have a certain complementary effect.

In an exemplary embodiment, ΣCT is a sum of center thicknesses of all lenses on the optical axis, ΣCT and an air space T67 of the sixth lens E6 and the seventh lens E7 on the optical axis satisfy: 1.5<ΣCT/T67<2.0. By controlling a ratio of the sum of the center thicknesses of all lenses on the optical axis to the air space between the sixth lens and the seventh lens on the optical axis, a position occupied by the sixth lens and the seventh lens in the entire lens group may be effectively controlled, such that the lenses are evenly arranged, which is convenient for moulding and assembly. TTL is an on-axis distance between an object-side surface of the first lens E1 and an imaging surface, ΣAT is a sum of the air spaces between the first lens E1 and any two adjacent lenses with refractive powers in the lenses closest to the imaging surface on the optical axis, and TTL and ΣAT satisfy: 2.0<TTL/ΣAT<2.5. By controlling a ratio of the on-axis distance between the object-side surface of the first lens and the imaging surface to the sum of the air spaces between the first lens and any two adjacent lenses with refractive powers in the lenses closest to the imaging surface on the optical axis, a spacing between each lens may be effectively controlled, so that the imaging system is evenly distributed, and better air gap sensitivity may be obtained, which is beneficial to improving a yield of the imaging system.

In an exemplary embodiment, a refractive index N1 of the first lens E1 satisfies: N1<1.5. By controlling the refractive index of the first lens to be less than 1.5, it may be guaranteed that the first lens uses a low-refractive material, which saves costs. An Abbe number V1 of the first lens E1 satisfies: 60<V1<71. By controlling the Abbe number of the first lens, the first lens may effectively improve a chromatic dispersion of the imaging system, so that the imaging system may obtain better imaging quality. The Abbe number V1 of the first lens E1 and the Abbe number V2 of the second lens E2 satisfy: V1−V2<52. By controlling a difference of the Abbe numbers of the first lens and the second lens, the first lens and the second lens may be effectively used to improve a chromatic dispersion of the imaging system, so that the imaging system may obtain better imaging quality.

The imaging system of the disclosure is described below with six embodiments. In the following embodiments, S1, S2, ..., Sn represent various surfaces in the imaging system, as well as object-side surface and image-side surface of plate glass E8 in front of an image surface, and an object surface of the imaging system is referred to as OBJ. A spherical formula is:

$$x = \frac{ch^2}{1+\sqrt{1-(k+1)c^2h^2}} + \sum A_i h^i;$$

Wherein, x is a vector height of a distance between the aspheric surface and a vertex of the aspheric surface when the aspheric surface is located at a position with the height h in the optical axis direction; c is a paraxial curvature of the aspheric surface, c=1/R (that is, the paraxial curvature c is a reciprocal of the curvature radius R in the above Table 1); k is a conic coefficient; and Ai is a correction coefficient of the i-th order of the aspheric surface.

Specific conditional expressions settings conform to the above embodiments are shown in Table 1 below:

TABLE 1

| Conditional expression/ Embodiment | 1 | 2 | 3 | 4 | 5 | 6 |
|---|---|---|---|---|---|---|
| TTL/ImgH | 1.56 | 1.56 | 1.56 | 1.56 | 1.56 | 1.56 |
| FOV | 149.2 | 149.1 | 149.0 | 149.0 | 149.0 | 149.0 |
| f/EPD | 2.42 | 2.42 | 2.42 | 2.42 | 2.42 | 2.42 |
| f1/R2 | −2.01 | −2.05 | −2.04 | −2.05 | −1.97 | −2.05 |
| f3/R5 | 1.74 | 1.75 | 1.77 | 1.85 | 1.74 | 1.70 |
| R9/f5 | −2.21 | −2.11 | −2.93 | −3.19 | −2.99 | −3.15 |
| f7/R13 | −2.55 | −1.84 | −1.85 | −1.85 | −2.33 | −1.82 |
| R8(R11 + R14) | 2.62 | 2.21 | 1.94 | 1.61 | 2.57 | 5.15 |
| R12/R10 | −1.17 | −0.79 | −1.16 | −1.19 | −1.08 | −1.11 |
| ΣCT/T67 | 1.76 | 1.78 | 1.72 | 1.68 | 1.98 | 1.67 |
| TTL/ΣAT | 2.46 | 2.44 | 2.42 | 2.37 | 2.37 | 2.03 |
| V1-V2 | 51.00 | 51.00 | 51.00 | 51.00 | 51.00 | 51.00 |

Optical parameter settings of various embodiments are shown in Table 2 below:

TABLE 2

| Embodiment parameter | 1 | 2 | 3 | 4 | 5 | 6 |
|---|---|---|---|---|---|---|
| f(mm) | 3.95 | 4.01 | 4.00 | 3.98 | 3.83 | 3.95 |
| f1(mm) | −5.06 | −5.25 | −5.15 | −5.38 | −4.39 | −5.17 |
| f2(mm) | 100.00 | −31.64 | −27.25 | −27.41 | −7997.69 | −26.77 |
| f3(mm) | 3.99 | 3.45 | 3.44 | 3.58 | 3.69 | 3.34 |
| f4(mm) | −51.37 | −34.35 | −54.67 | −112.53 | −100.00 | −31.92 |
| f5(mm) | 3.97 | 6.30 | 3.70 | 3.72 | 3.63 | 3.68 |
| f6(mm) | −9.51 | 333.33 | −8.44 | −8.33 | −8.17 | −8.53 |
| f7(mm) | −9.51 | −7.96 | −8.20 | −8.15 | −10.02 | −8.17 |

TABLE 2-continued

| Embodiment parameter | 1 | 2 | 3 | 4 | 5 | 6 |
|---|---|---|---|---|---|---|
| TTL(mm) | 8.00 | 8.00 | 8.00 | 8.00 | 8.00 | 8.00 |
| ImgH(mm) | 5.12 | 5.12 | 5.12 | 5.12 | 5.12 | 5.12 |
| Semi-FOV(°) | 74.6 | 74.5 | 74.5 | 74.5 | 74.5 | 74.5 |

First Embodiment

As shown in FIG. 1, in the embodiment, a refractive power of the first lens E1 is negative, an object-side surface S1 thereof is a plane, and an image-side surface S2 thereof is a concave surface; an refractive power of the second lens E2 is positive, an object-side surface S3 thereof is a concave surface, and an image-side surface S4 thereof is a convex surface; an refractive power of the third lens E3 is positive, an object-side surface S5 thereof is a convex surface, and an image-side surface S6 thereof is a convex surface; an refractive power of the fourth lens E4 is negative, an object-side surface S7 thereof is a convex surface, and an image-side surface S8 thereof is a concave surface; an refractive power of the fifth lens E5 is positive, an object-side surface S9 thereof is a concave surface, and an image-side surface S10 thereof is a convex surface; an refractive power of the sixth lens E6 is negative, an object-side surface S11 thereof is a convex surface, and an image-side surface S12 thereof is a concave surface; an refractive power of the seventh lens E7 is negative, an object-side surface S13 thereof is a convex surface, and an image-side surface S14 thereof is a concave surface; and a diaphragm STO is located between the third lens E3 and the fourth lens E4.

Parameters of various optical elements in the imaging system of the embodiment are shown in Table 3 below:

TABLE 3

| Surface number | Surface type | Curvature radius | Thickness | Material | Conic coefficient |
|---|---|---|---|---|---|
| OBJ | Spherical | Infinite | 600.0000 | | |
| S1 | Spherical | Infinite | 0.3800 | 1.49, 70.2 | |
| S2 | Aspheric | 2.5178 | 0.8145 | | −0.1085 |
| S3 | Aspheric | −14.7719 | 0.3337 | 1.68, 19.2 | −12.3872 |
| S4 | Aspheric | −12.2365 | 0.0401 | | −95.7259 |
| S5 | Aspheric | 2.2933 | 0.8747 | 1.55, 55.9 | 0.0000 |
| S6 | Aspheric | −36.8523 | 0.0823 | | 97.7751 |
| STO | Spherical | Infinite | 0.1591 | | |
| S7 | Aspheric | 24.3129 | 0.3200 | 1.68, 19.2 | 0.0000 |
| S8 | Aspheric | 14.2332 | 0.1409 | | 0.0000 |
| S9 | Aspheric | −8.7780 | 0.7128 | 1.55, 55.9 | 0.0000 |
| S10 | Aspheric | −1.7883 | 0.0400 | | 0.0000 |
| S11 | Aspheric | 3.3622 | 0.3200 | 1.64, 23.5 | −0.1119 |
| S12 | Aspheric | 2.0895 | 1.9699 | | −0.0015 |
| S13 | Aspheric | 3.7264 | 0.5270 | 1.55, 55.9 | 0.0000 |
| S14 | Aspheric | 2.0609 | 0.4638 | | −0.9865 |
| S15 | Spherical | Infinite | 0.2100 | 1.52, 64.2 | |
| S16 | Spherical | Infinite | 0.6112 | | |
| S17 | Spherical | Infinite | | | |

Aspheric parameters in the embodiment are shown in Table 4 and Table 5 below, wherein A4, A6, ..., A30 respectively represent aspheric coefficients of corresponding orders:

TABLE 4

| Surface number | A4 | A6 | A5 | A10 | A12 | A14 | A16 |
|---|---|---|---|---|---|---|---|
| S2 | 1.6381E−01 | 2.6481E−01 | −4.7674E−03 | −7.4875E−03 | −4.0495E−03 | −1.3130E−03 | −1.1929E−04 |
| S3 | 2.6481E−01 | −1.1514E−02 | −1.4408E−02 | −4.5617E−03 | −7.5030E−04 | 1.6539E−04 | 3.6798E−05 |
| S4 | 2.7573E−01 | −7.4258E−03 | −6.1075E−04 | −3.9415E−03 | 4.9406E−04 | −3.7020E−04 | 1.8986E−04 |
| S5 | 8.7248E−02 | −1.2593E−02 | 3.4268E−03 | −2.5645E−03 | 3.0333E−04 | −6.0938E−04 | −6.1113E−06 |
| S6 | −5.9841E−02 | 4.8106E−03 | −5.5500E−04 | −1.7308E−03 | −7.0388E−04 | −3.9408E−05 | −8.4502E−06 |
| S7 | −1.9787E−01 | 7.9265E−03 | −1.1430E−04 | −2.5732E−04 | 1.1154E−06 | −6.2263E−06 | −2.5624E−06 |
| S8 | −7.7717E−02 | 1.7467E−02 | 3.4745E−03 | 1.7177E−04 | 1.7026E−04 | 3.8058E−05 | 2.7133E−06 |
| S9 | −3.2927E−02 | −2.9624E−03 | 4.0729E−03 | 3.8457E−04 | 3.6583E−04 | 1.3912E−04 | 3.5976E−05 |
| S10 | 2.6609E−02 | −2.2315E−02 | 6.3586E−04 | −1.5494E−03 | 1.7171E−04 | −1.0060E−04 | 9.3115E−05 |
| S11 | −5.3404E−01 | −1.5994E−02 | −1.0899E−02 | −4.2587E−03 | −1.3038E−03 | −5.4085E−04 | −1.4629E−04 |
| S12 | −1.3945E+00 | 1.5760E−02 | −6.1008E−02 | −1.0310E−02 | −8.4377E−03 | −2.4176E−03 | −1.8561E−03 |
| S13 | −4.3190E+00 | 7.5056E−01 | −3.8190E−01 | −8.3695E−03 | −3.5235E−02 | −1.3844E−02 | −1.4215E−02 |
| S14 | −5.5787E+00 | 8.8733E−01 | −2.0708E−01 | 7.5813E−02 | −4.6764E−02 | 3.8002E−03 | −3.2975E−03 |

TABLE 5

| Surface number | A18 | A20 | A22 | A24 | A26 | A28 | A30 |
|---|---|---|---|---|---|---|---|
| S2 | 1.0231E−04 | 6.1099E−05 | 0.0000E+00 | 0.0000E+00 | 0.0000E+00 | 0.0000E+00 | 0.0000E+00 |
| S3 | −3.0382E−05 | −4.3036E−05 | −1.0923E−05 | −9.9057E−06 | 2.7736E−07 | 1.2642E−06 | 3.3486E−06 |
| S4 | −1.2667E−04 | 3.1306E−05 | −2.4406E−05 | 1.0105E−05 | −5.3348E−06 | 2.7677E−06 | 1.2326E−07 |
| S5 | −1.6090E−04 | −6.0365E−06 | −3.3521E−05 | −4.9128E−06 | −7.0469E−06 | −2.1726E−06 | 2.7760E−07 |
| S6 | −5.5184E−06 | −9.7123E−08 | −2.7398E−06 | 5.5415E−07 | −6.0538E−07 | 5.5952E−07 | 2.9831E−07 |
| S7 | 0.0000E+00 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 | 0.0000E+00 |
| S10 | −1.3734E−05 | 2.6530E−05 | −4.8121E−06 | 6.3594E−06 | 5.7915E−07 | 0.0000E+00 | 0.0000E+00 |
| S11 | −1.1687E−04 | −1.5632E−05 | −4.2132E−05 | −2.8109E−06 | 0.0000E+00 | 0.0000E+00 | 0.0000E+00 |
| S12 | −3.7733E−04 | −2.6362E−04 | 0.0000E+00 | 0.0000E+00 | 0.0000E+00 | 0.0000E+00 | 0.0000E+00 |
| S13 | −7.1440E−03 | −3.9629E−03 | −3.3421E−03 | −1.9295E−03 | −1.0189E−03 | −7.0205E−04 | −2.3053E−04 |
| S14 | 1.9887E−03 | 2.9147E−04 | 2.7053E−04 | 3.4457E−06 | −2.6189E−05 | 1.2348E−04 | 6.0475E−05 |

Figure 2:
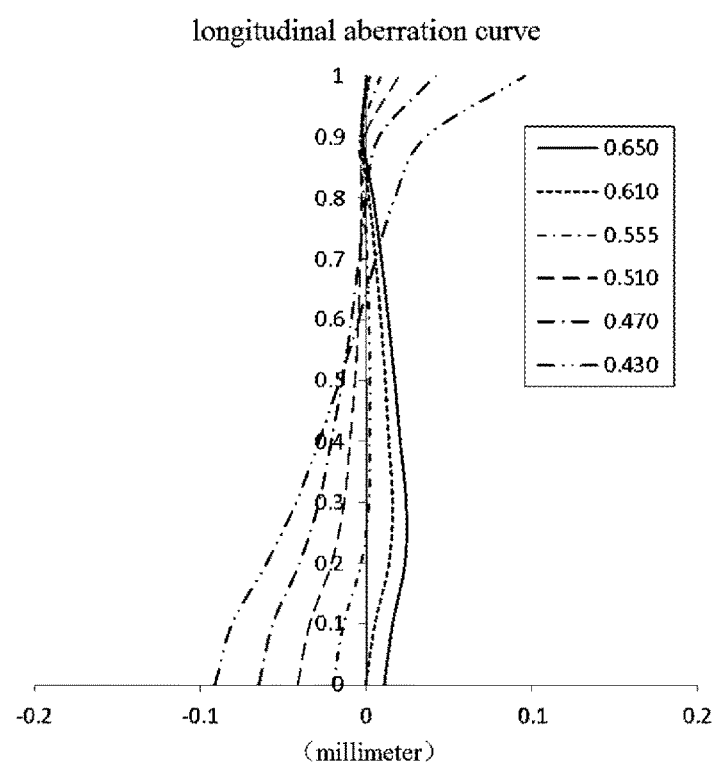
FIG. 2 schematically shows a longitudinal aberration curve diagram of the imaging system according to the first embodiment of the disclosure.
Figure 3:
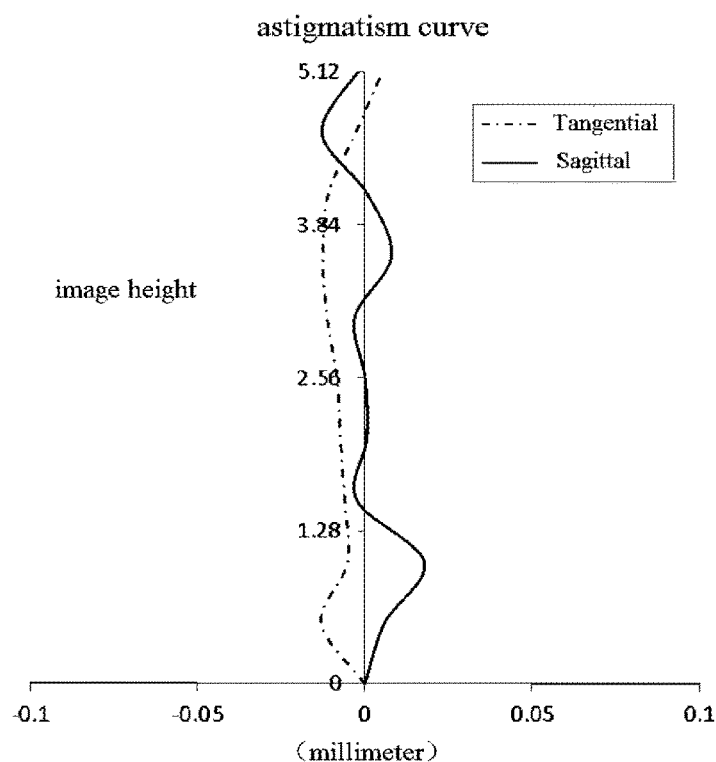
FIG. 3 schematically shows an astigmatism curve diagram of the imaging system according to the first embodiment of the disclosure.
Figure 4:
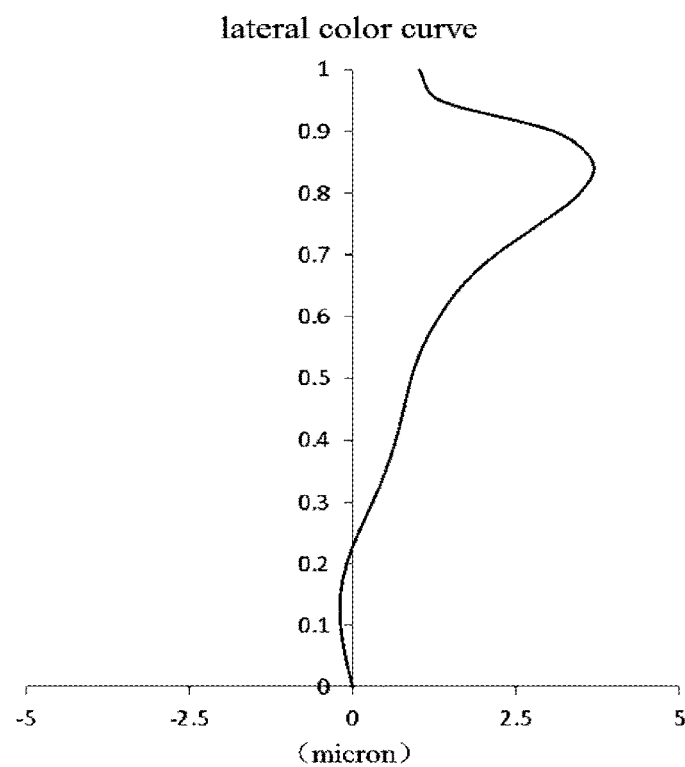
FIG. 4 schematically shows a lateral color curve diagram of the imaging system according to the first embodiment of the disclosure.

FIG. 2 schematically shows a longitudinal aberration curve diagram of the imaging system according to the first embodiment of the disclosure, which represents deviations of a convergence focal point after lights with different wavelengths pass through the lens; FIG. 3 schematically shows an astigmatism curve diagram of the imaging system according to the first embodiment of the disclosure, which represents a tangential image surface curvature and a sagittal image surface curvature; FIG. 4 schematically shows a lateral color curve diagram of the imaging system according to the first embodiment of the disclosure, which represents deviations of different image heights on the imaging surface after light passes through the lens; and in combination with FIGS. 2-4, it can be seen that the imaging system of the embodiment may realize good imaging quality.

Second Embodiment

Figure 5:
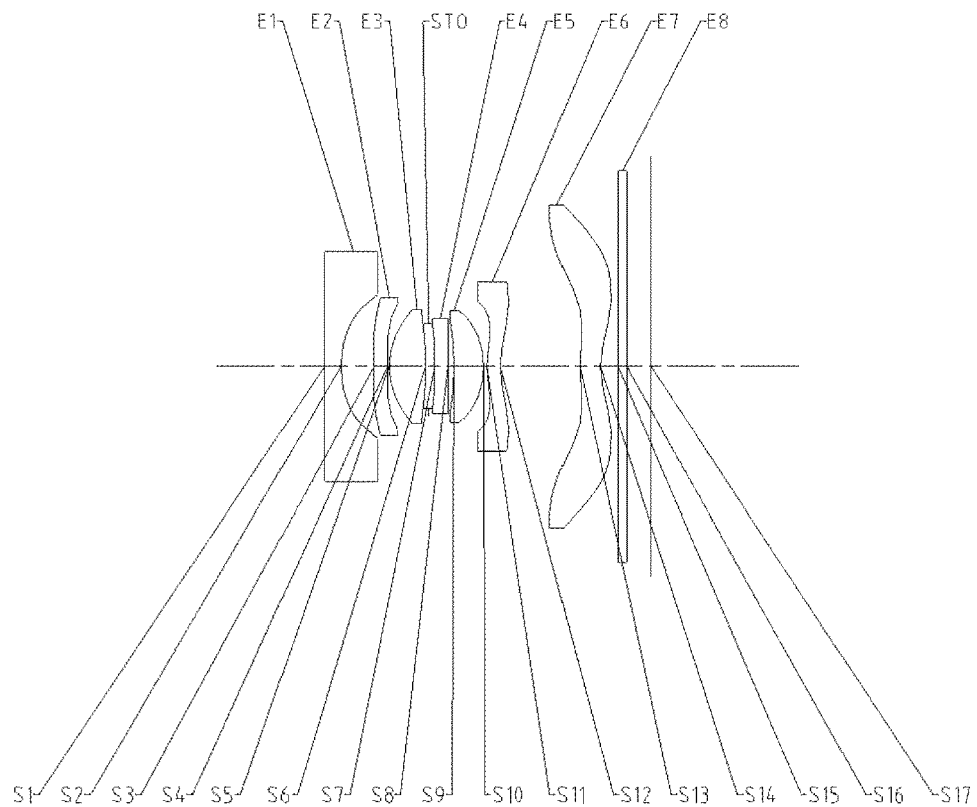
FIG. 5 schematically shows a structural diagram of an imaging system according to a second embodiment of the disclosure.

As shown in FIG. 5, in the embodiment, an refractive power of the first lens E1 is negative, an object-side surface S1 thereof is a plane, and an image-side surface S2 thereof is a concave surface; an refractive power of the second lens E2 is negative, an object-side surface S3 thereof is a concave surface, and an image-side surface S4 thereof is a convex surface; an refractive power of the third lens E3 is positive, an object-side surface S5 thereof is a convex surface, and an image-side surface S6 thereof is a convex surface; an refractive power of the fourth lens E4 is negative, an object-side surface S7 thereof is a convex surface, and an image-side surface S8 thereof is a concave surface; an refractive power of the fifth lens E5 is positive, an object-side surface S9 thereof is a concave surface, and an image-side surface S10 thereof is a convex surface; an refractive power of the sixth lens E6 is positive, an object-side surface S11 thereof is a convex surface, and an image-side surface S12 thereof is a concave surface; an refractive power of the seventh lens E7 is negative, an object-side surface S13 thereof is a convex surface, and an image-side surface S14 thereof is a concave surface; and a diaphragm STO is located between the third lens E3 and the fourth lens E4.

Parameters of various optical elements in the imaging system of the embodiment are shown in Table 6 below:

TABLE 6

| Surface number | Surface type | Curvature radius | Thickness | Material | Conic coefficient |
|---|---|---|---|---|---|
| OBJ | Spherical | Infinite | 600.0000 | | |
| S1 | Spherical | Infinite | 0.3907 | 1.49, 70.2 | |
| S2 | Aspheric | 2.5652 | 0.8227 | | −0.0136 |
| S3 | Aspheric | −18.7223 | 0.3244 | 1.68, 19.2 | −11.3877 |
| S4 | Aspheric | −149.6402 | 0.0410 | | 74.7680 |
| S5 | Aspheric | 1.9741 | 0.8875 | 1.55, 55.9 | 0.0019 |
| S6 | Aspheric | −34.1479 | 0.0829 | | 2.1173 |
| STO | Spherical | Infinite | 0.1522 | | |
| S7 | Aspheric | 16.8028 | 0.3213 | 1.68, 19.2 | 13.8946 |
| S8 | Aspheric | 9.6788 | 0.1474 | | 0.9108 |
| S9 | Aspheric | −13.3129 | 0.7288 | 1.55, 55.9 | −5.7918 |
| S10 | Aspheric | −2.7843 | 0.0829 | | 0.0097 |
| S11 | Aspheric | 2.2938 | 0.3208 | 1.64, 23.5 | 0.0021 |
| S12 | Aspheric | 2.1915 | 1.9554 | | 0.0001 |
| S13 | Aspheric | 4.3221 | 0.4978 | 1.55, 55.9 | −0.0043 |
| S14 | Aspheric | 2.0781 | 0.4430 | | −0.9636 |
| S15 | Spherical | Infinite | 0.2100 | 1.52, 64.2 | |
| S16 | Spherical | Infinite | 0.5910 | | |
| S17 | Spherical | Infinite | | | |

Aspheric parameters in the embodiment are shown in Table 7 and Table 8 below, wherein A4, A6, . . . , A30 respectively represent aspheric coefficients of corresponding orders:

TABLE 7

| Surface number | A4 | A6 | A8 | A10 | A12 | A14 | A16 |
|---|---|---|---|---|---|---|---|
| S2 | 1.8249E−01 | 2.6973E−02 | −2.7622E−03 | −5.788E−03 | −3.2918E−03 | −1.1551E−03 | −1.7594E−04 |
| S3 | 2.6358E−01 | −1.4444E−02 | −1.0851E−02 | −4.1494E−03 | −5.3966E−04 | 1.2523E−04 | 7.4677E−05 |
| S4 | 2.6108E−01 | −3.3923E−03 | −8.2906E−03 | −3.9552E−03 | −5.3397E−04 | −3.5448E−05 | 2.9777E−05 |
| S5 | 5.5337E−03 | −4.0851E−05 | −1.6549E−03 | −1.7096E−03 | −8.7156E−04 | −5.9447E−04 | −3.1877E−04 |
| S6 | −6.0139E−02 | 5.9241E−03 | −9.2656E−04 | −2.8623E−04 | −1.5238E−04 | −7.1122E−05 | −3.2147E−05 |
| S7 | −9.8195E−02 | 6.1642E−03 | −3.3043E−05 | −1.2723E−04 | 2.9303E−06 | −2.5751E−06 | 9.4388E−08 |
| S8 | −8.1892E−02 | 1.7284E−02 | 3.1946E−03 | 2.4815E−04 | 1.2954E−04 | 1.2982E−05 | −5.3600E−06 |
| S9 | −5.4850E−02 | −1.1040E−03 | 4.1561E−03 | 6.4258E−04 | 3.2201E−04 | 1.1168E−04 | 4.3550E−06 |
| S10 | −2.2603E−01 | 1.0146E−02 | −1.1949E−02 | 2.4645E−03 | −1.5773E−03 | 5.0997E−04 | −2.4161E−04 |
| S11 | −7.8460E−01 | 3.1218E−02 | −2.3104E−02 | 1.9512E−03 | −3.2536E−03 | 5.8176E−04 | −6.1179E−04 |
| S12 | −1.2543E+00 | 4.9830E−02 | −3.7165E−02 | −2.2723E−03 | −3.2885E−03 | −4.5946E−04 | −4.3320E−04 |
| S13 | −3.4810E+00 | 9.1453E−01 | −3.0248E−01 | 5.8398E−02 | −1.4697E−02 | 6.2331E−03 | −3.7842E−03 |
| S14 | −5.5442E+00 | 9.3250E−01 | −2.3052E−01 | 9.2620E−02 | −4.9576E−02 | 8.3569E−03 | −6.2291E−03 |

TABLE 8

| Surface number | A18 | A20 | A22 | A24 | A26 | A28 | A30 |
|---|---|---|---|---|---|---|---|
| S2 | 5.1814E−05 | 4.0817E−05 | 0.0000E+00 | 0.0000E+00 | 0.0000E+00 | 0.0000E+00 | 0.0000E+00 |
| S3 | −2.4498E−05 | −3.7239E−05 | −12357E−05 | −6.8414E−06 | 10625E−06 | −3.6450E−06 | −9.0902E−07 |
| S4 | −4.8754E−05 | −7.7369E−06 | 18643E−05 | 2.0013E−05 | 19166E−05 | 9.0184E−06 | 6.5277E−06 |
| S5 | −19998E−04 | −11864E−04 | −6.4188E−05 | −3.9484E−05 | −19428E−05 | −12493E−05 | −19829E−06 |
| S6 | −15323E−05 | −2.8117E−06 | −8.2108E−07 | 2.0176E−06 | 7.9736E−07 | −7.6490E−07 | 2.5450E−07 |
| S7 | 0.0000E+00 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 | 0.0000E+00 |
| S10 | 7.6078E−05 | −3.9721E−05 | 7.3696E−06 | 3.2803E−06 | −3.8999E−06 | 0.0000E+00 | 0.0000E+00 |
| S11 | 12221E−04 | −12961E−04 | 17999E−05 | −2.8017E−05 | 0.0000E+00 | 0.0000E+00 | 0.0000E+00 |
| S12 | −7.0756E−05 | −6.8815E−05 | −16507E−05 | −5.4909E−06 | 0.0000E+00 | 0.0000E+00 | 0.0000E+00 |
| S13 | 6.9394E−04 | −8.0337E−05 | −9.9068E−05 | −13860E−04 | 10514E−04 | −5.5405E−05 | 14710E−05 |
| S14 | 2.7311E−03 | −6.9539E−04 | 2.2536E−04 | −4.8126E−04 | −2.4287E−04 | −15719E−04 | −5.8221E−05 |

Figure 6:
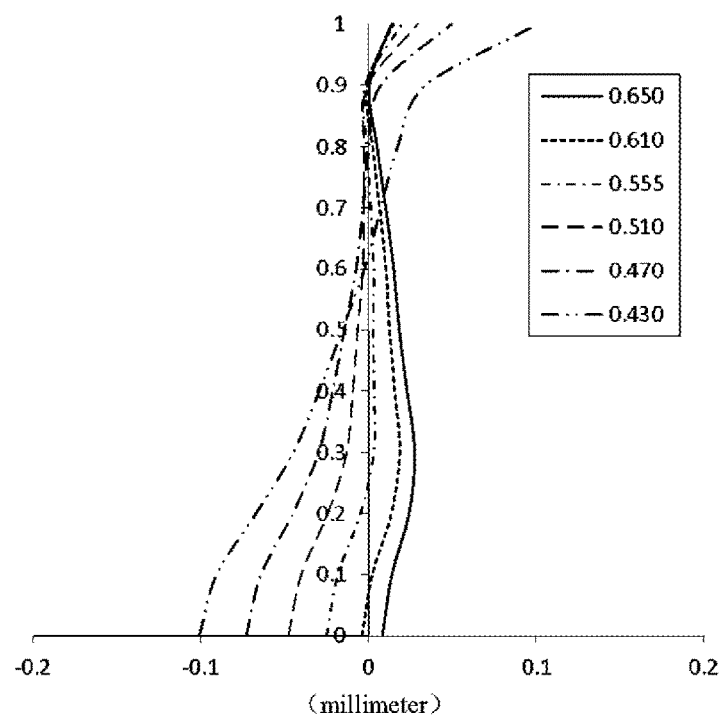
FIG. 6 schematically shows a longitudinal aberration curve diagram of the imaging system according to the second embodiment of the disclosure.
Figure 7:
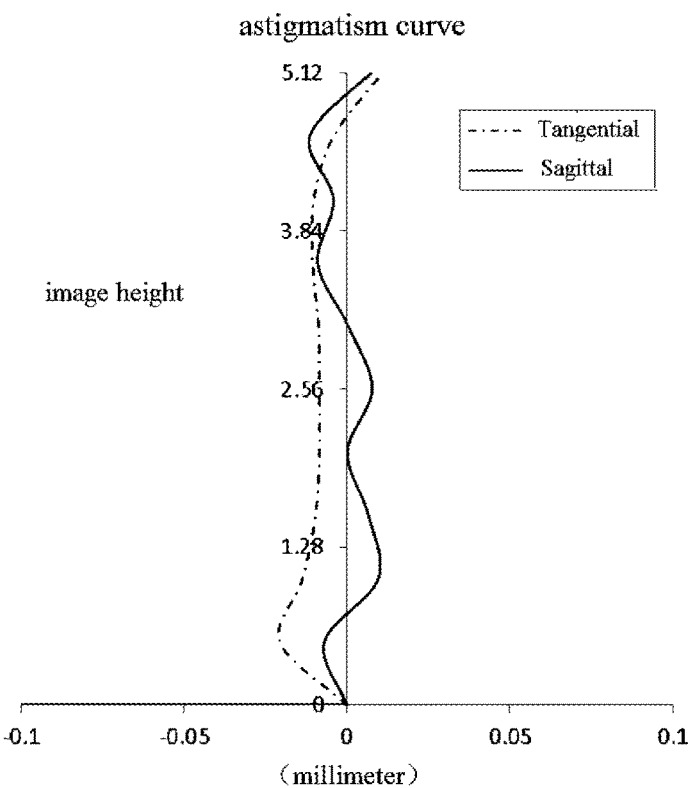
FIG. 7 schematically shows an astigmatism curve diagram of the imaging system according to the second embodiment of the disclosure.
Figure 8:
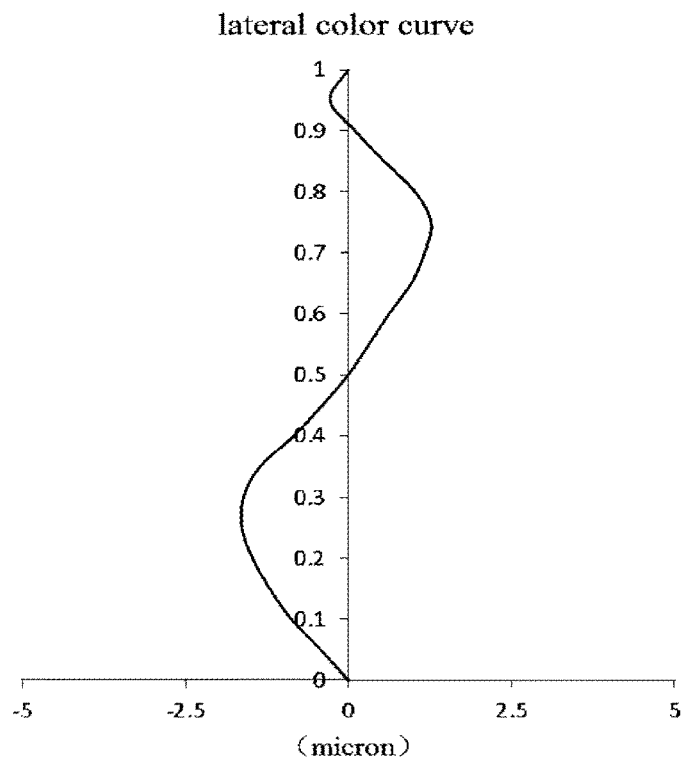
FIG. 8 schematically shows a lateral color curve diagram of the imaging system according to the second embodiment of the disclosure.

FIG. 6 schematically shows a longitudinal aberration curve diagram of the imaging system according to the second embodiment of the disclosure, which represents deviations of a convergence focal point after lights with different wavelengths pass through the lens; FIG. 7 schematically shows an astigmatism curve diagram of the imaging system according to the second embodiment of the disclosure, which represents a tangential image surface curvature and a sagittal image surface curvature; FIG. 8 schematically shows a lateral color curve diagram of the imaging system according to the second embodiment of the disclosure, which represents the deviation of different image heights on the imaging surface after the light passes through the lens; and in combination with FIGS. 6-8, it can be seen that the imaging system of the embodiment may realize good imaging quality.

Third Embodiment

Figure 9:
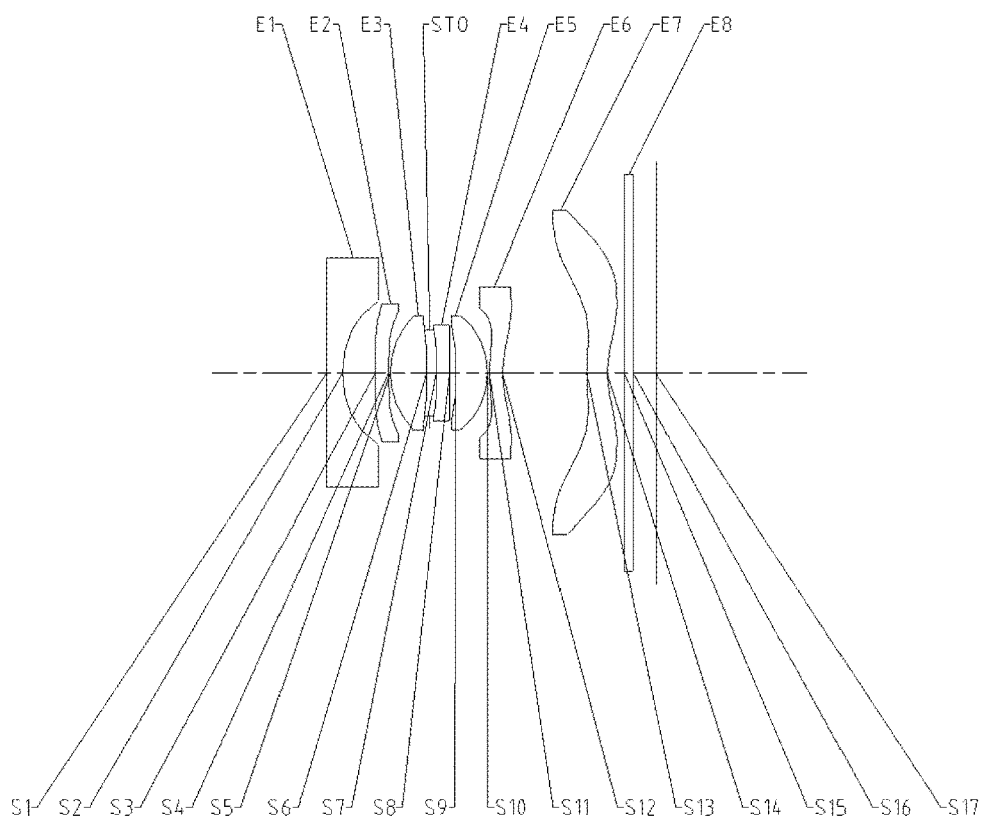
FIG. 9 schematically shows a structural diagram of an imaging system according to a third embodiment of the disclosure.

As shown in FIG. 9, in the embodiment, an refractive power of the first lens E1 is negative, an object-side surface S1 thereof is a plane, and an image-side surface S2 thereof is a concave surface; an refractive power of the second lens E2 is negative, an object-side surface S3 thereof is a concave surface, and an image-side surface S4 thereof is a concave surface; an refractive power of the third lens E3 is positive, an object-side surface S5 thereof is a convex surface, and an image-side surface S6 thereof is a convex surface; an refractive power of the fourth lens E4 is negative, an object-side surface S7 thereof is a convex surface, and an image-side surface S8 thereof is a concave surface; an refractive power of the fifth lens E5 is positive, an object-side surface S9 thereof is a concave surface, and an image-side surface S10 thereof is a convex surface; an refractive power of the sixth lens E6 is negative, an object-side surface S11 thereof is a convex surface, and an image-side surface S12 thereof is a concave surface; an refractive power of the seventh lens E7 is negative, an object-side surface S13 thereof is a convex surface, and an image-side surface S14 thereof is a concave surface; and a diaphragm STO is located between the third lens E3 and the fourth lens E4.

Parameters of various optical elements in the imaging system of the embodiment are shown in Table 9 below:

TABLE 9

| Surface number | Surface type | Curvature radius | Thickness | Material | Conic coefficient |
|---|---|---|---|---|---|
| OBJ | Spherical | Infinite | 600.0000 | | |
| S1 | Spherical | Infinite | 0.3800 | 1.49, 70.2 | |
| S2 | Aspheric | 2.5277 | 0.8008 | | −0.1603 |
| S3 | Aspheric | −22.6499 | 0.3200 | 1.68, 19.2 | 36.4095 |
| S4 | Aspheric | 100.0000 | 0.0408 | | 99.0000 |
| S5 | Aspheric | 1.9459 | 0.8891 | 1.55, 55.9 | −0.0039 |
| S6 | Aspheric | −43.3319 | 0.0711 | | 99.0000 |
| STO | Spherical | Infinite | 0.1603 | | |
| S7 | Aspheric | 15.4222 | 0.3200 | 1.68, 19.2 | 9.1847 |
| S8 | Aspheric | 10.7944 | 0.1550 | | −2.9689 |
| S9 | Aspheric | −10.8367 | 0.7700 | 1.55, 55.9 | 5.0519 |
| S10 | Aspheric | −1.7436 | 0.0400 | | 0.0038 |
| S11 | Aspheric | 3.4291 | 0.3200 | 1.64, 23.5 | −0.1720 |
| S12 | Aspheric | 2.0259 | 2.0325 | | −1.0050 |

TABLE 9-continued

| Surface number | Surface type | Curvature radius | Thickness | Material | Conic coefficient |
|---|---|---|---|---|---|
| S13 | Aspheric | 4.4378 | 0.4970 | 1.55, 55.9 | −0.0061 |
| S14 | Aspheric | 2.1400 | 0.4238 | | −0.9656 |
| S15 | Spherical | Infinite | 0.2100 | 1.52, 64.2 | |
| S16 | Spherical | Infinite | 0.5696 | | |
| S17 | Spherical | Infinite | | | |

Aspheric parameters in the embodiment are shown in Table 10 and Table 11 below, wherein A4, A6, . . . , A30 respectively represent aspheric coefficients of corresponding orders:

TABLE 10

| Surface number | A4 | A6 | A8 | A10 | A12 | A14 | A16 |
|---|---|---|---|---|---|---|---|
| S2 | 1.7923E−01 | 2.4733E−02 | −5.0922E−03 | −6.6221E−03 | −3.1083E−03 | −7.2465E−04 | 1.2550E−04 |
| S3 | 2.6199E−01 | −1.7077E−02 | −1.1749E−02 | −3.1945E−03 | −1.7531E−05 | 3.1954E−04 | 7.3462E−05 |
| S4 | 2.4960E−01 | −2.2345E−03 | −7.4616E−03 | −2.4185E−03 | −3.5921E−04 | −2.5747E−05 | −1.0478E−04 |
| S5 | 8.4263E−04 | 6.1339E−04 | −1.7020E−03 | −9.8807E−04 | −6.9414E−04 | −3.6203E−04 | −2.5451E−04 |
| S6 | −6.2078E−02 | 5.3537E−03 | −1.0331E−03 | −3.5338E−04 | −1.6579E−04 | −7.4734E−05 | −1.8030E−05 |
| S7 | −1.0365E−01 | 5.7849E−03 | 1.8102E−04 | −1.3203E−04 | 1.2841E−06 | −2.8455E−06 | 1.3346E−07 |
| S8 | −8.7081E−02 | 1.7382E−02 | 3.6694E−03 | 2.0301E−04 | 1.1595E−04 | 1.5557E−05 | −2.4896E−06 |
| S9 | −5.9950E−02 | −2.2250E−03 | 4.6459E−03 | 5.2599E−04 | 3.1574E−04 | 1.0067E−04 | 1.5889E−05 |
| S10 | 4.5045E−02 | −2.4586E−02 | 1.3251E−03 | −1.8163E−03 | 2.6178E−04 | −1.4580E−04 | 1.0674E−04 |
| S11 | −5.4903E−01 | −1.0292E−02 | −9.2069E−03 | −3.3416E−03 | −8.5667E−04 | −3.9756E−04 | −5.0941E−05 |
| S12 | −9.4845E−01 | 1.2846E−01 | −2.7163E−02 | 5.8660E−03 | −1.8873E−03 | 9.5543E−04 | −4.5246E−04 |
| S13 | −3.4535E+00 | 9.3690E−01 | −2.9404E−01 | 5.3120E−02 | −1.1691E−02 | 4.9431E−03 | −2.7237E−03 |
| S14 | −5.5026E+00 | 9.1363E−01 | −2.0959E−01 | 8.6896E−02 | −4.6723E−02 | 4.3703E−03 | −5.4129E−03 |

TABLE 11

| Surface number | A18 | A20 | A22 | A24 | A26 | A28 | A30 |
|---|---|---|---|---|---|---|---|
| S2 | 1.7654E−04 | 6.9262E−05 | 0.0000E+00 | 0.0000E+00 | 0.0000E+00 | 0.0000E+00 | 0.0000E+00 |
| S3 | −3.4671E−05 | −2.1935E−05 | 3.2932E−06 | 5.0190E−06 | 4.7380E−06 | 4.0660E−06 | 2.1476E−06 |
| S4 | −6.4170E−05 | −7.4048E−06 | 2.8627E−05 | 1.7331E−05 | 1.4554E−05 | 7.9329E−06 | 4.4773E−06 |
| S5 | −1.2170E−04 | −7.8972E−05 | −2.6275E−05 | −1.9337E−05 | −1.9372E−06 | −9.8887E−07 | 4.5531E−06 |
| S6 | −1.4936E−06 | 8.8369E−06 | 6.1219E−06 | 7.6150E−06 | 2.4807E−06 | 1.3570E−06 | −1.1350E−06 |
| S7 | 0.0000E+00 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 | 0.0000E+00 |
| S10 | −2.1064E−05 | 3.3487E−05 | 3.2333E−06 | 1.3324E−05 | 2.4930E−06 | 0.0000E+00 | 0.0000E+00 |
| S11 | −6.6269E−05 | 2.7461E−05 | −1.1649E−05 | 1.2930E−05 | 0.0000E+00 | 0.0000E+00 | 0.0000E+00 |
| S12 | 2.0968E−04 | −9.6444E−05 | 3.7855E−05 | −1.2439E−05 | 0.0000E+00 | 0.0000E+00 | 0.0000E+00 |
| S13 | −9.7770E−06 | 5.0102E−04 | −1.8940E−04 | −8.9649E−05 | 8.7408E−05 | −3.3717E−05 | 4.6970E−06 |
| S14 | 1.7299E−03 | −4.6351E−04 | −2.4315E−05 | −2.4715E−04 | −2.1635E−04 | −9.4968E−07 | −3.3541E−05 |

Figure 10:
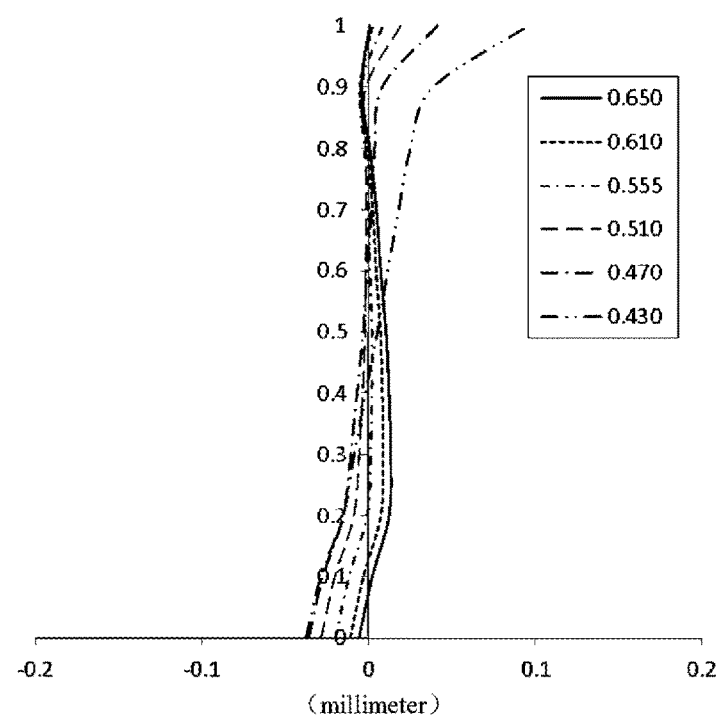
FIG. 10 schematically shows a longitudinal aberration curve diagram of the imaging system according to the third embodiment of the disclosure.
Figure 11:
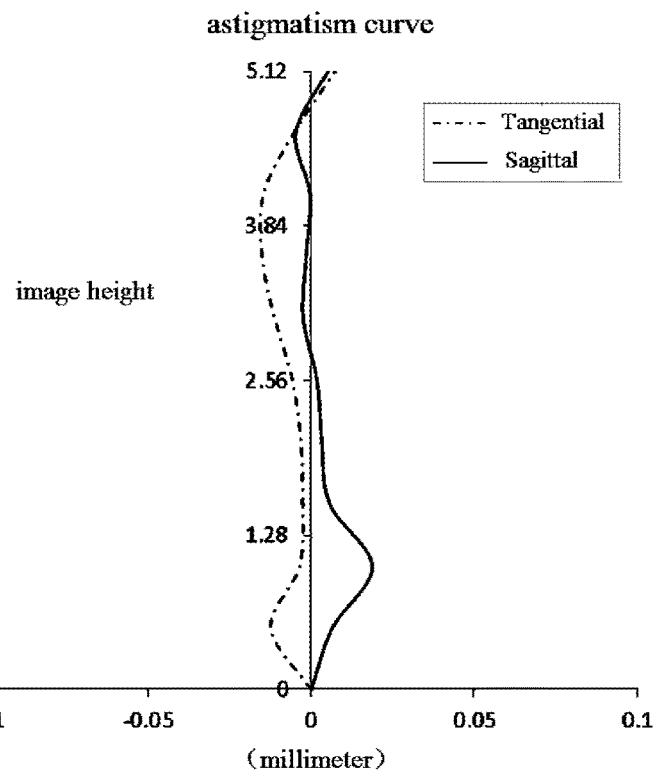
FIG. 11 schematically shows an astigmatism diagram of the imaging system according to the third embodiment of the disclosure.
Figure 12:
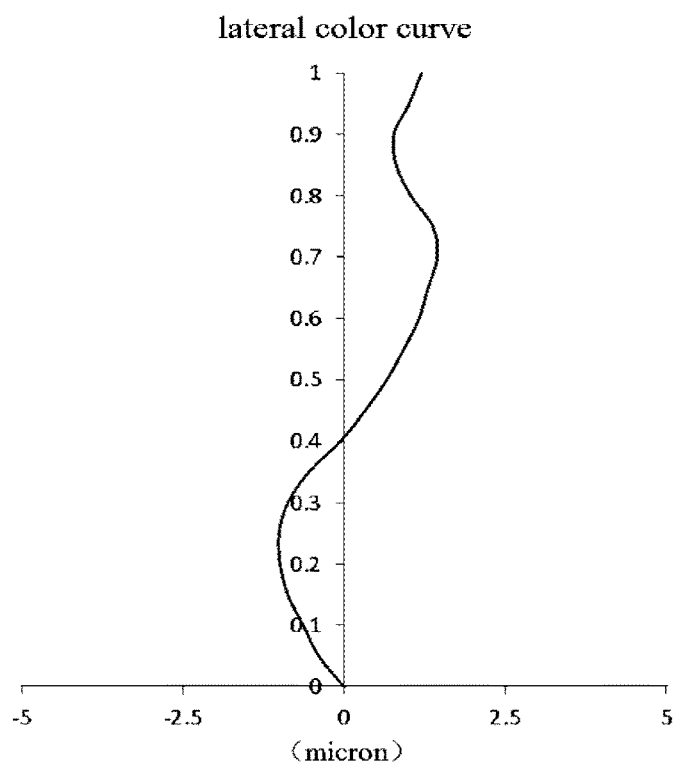
FIG. 12 schematically shows a lateral color curve diagram of the imaging system according to the third embodiment of the disclosure.

FIG. 10 schematically shows a longitudinal aberration curve diagram of the imaging system according to the third embodiment of the disclosure, which represents deviations of a convergence focal point after lights with different wavelengths pass through the lens; FIG. 11 schematically shows an astigmatism curve diagram of the imaging system according to the third embodiment of the disclosure, which represents a tangential image surface curvature and a sagittal image surface curvature; FIG. 12 schematically shows a lateral color curve diagram of the imaging system according to the third embodiment of the disclosure, which represents the deviation of different image heights on the imaging surface after the light passes through the lens; and in combination with FIGS. 10-12, it can be seen that the imaging system of the embodiment may realize good imaging quality.

Fourth Embodiment

Figure 13:
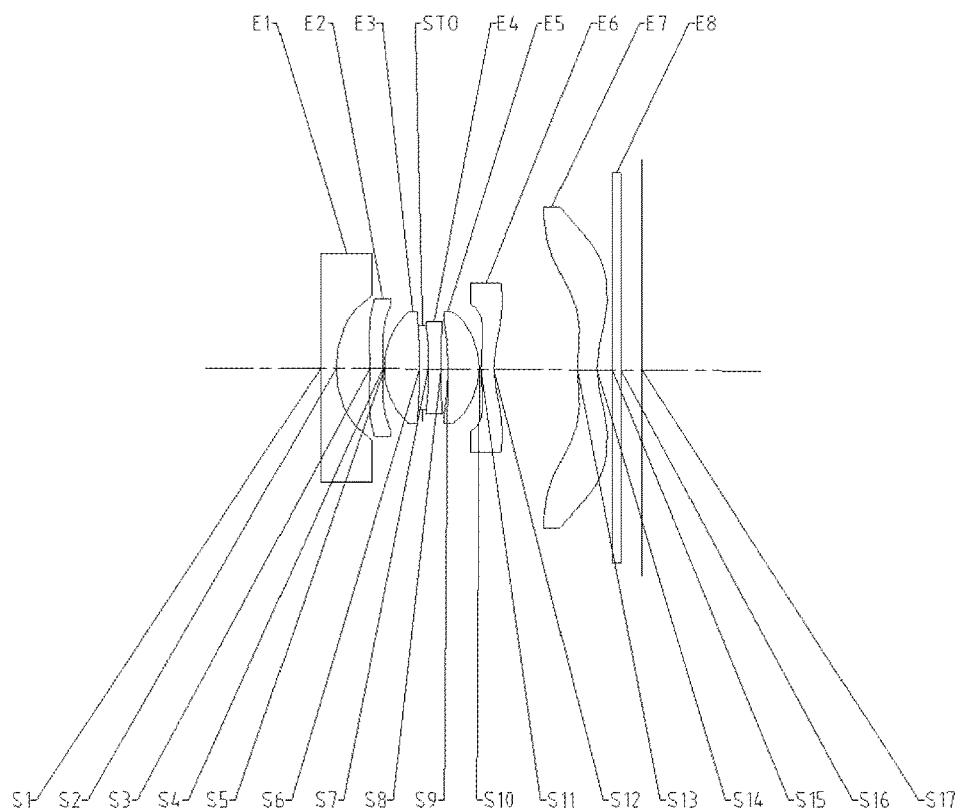
FIG. 13 schematically shows a structural diagram of an imaging system according to a fourth embodiment of the disclosure.

As shown in FIG. 13, in the embodiment, an refractive power of the first lens E1 is negative, an object-side surface S1 thereof is a plane, and an image-side surface S2 thereof is a concave surface; an refractive power of the second lens E2 is negative, an object-side surface S3 thereof is a concave surface, and an image-side surface S4 thereof is a convex surface; an refractive power of the third lens E3 is positive, an object-side surface S5 thereof is a convex surface, and an image-side surface S6 thereof is a concave surface; an refractive power of the fourth lens E4 is negative, an object-side surface S7 thereof is a convex surface, and an image-side surface S8 thereof is a concave surface; an refractive power of the fifth lens E5 is positive, an object-side surface S9 thereof is a concave surface, and an image-side surface S10 thereof is a convex surface; an refractive power of the sixth lens E6 is negative, an object-side surface S11 thereof is a convex surface, and an image-side surface S12 thereof is a concave surface; an refractive power of the seventh lens E7 is negative, an object-side surface S13 thereof is a convex surface, and an image-side surface S14 thereof is a concave surface; and a diaphragm STO is located between the third lens E3 and the fourth lens E4.

Parameters of various optical elements in the imaging system of the embodiment are shown in Table 12 below:

TABLE 12

| Surface number | Surface type | Curvature radius | Thickness | Material | Conic coefficient |
|---|---|---|---|---|---|
| OBJ | Spherical | Infinite | 600.0000 | | |
| S1 | Spherical | Infinite | 0.3800 | 1.49, 70.2 | |
| S2 | Aspheric | 2.6296 | 0.8392 | | 0.3278 |
| S3 | Aspheric | −12.7156 | 0.3200 | 1.68, 19.2 | −7.6164 |
| S4 | Aspheric | −40.8274 | 0.0400 | | −57.6466 |
| S5 | Aspheric | 1.9294 | 0.8765 | 1.55, 55.9 | 0.0453 |
| S6 | Aspheric | 142.8571 | 0.0842 | | 99.0000 |
| STO | Spherical | Infinite | 0.1339 | | |
| S7 | Aspheric | 10.8061 | 0.3200 | 1.68, 19.2 | 18.4676 |
| S8 | Aspheric | 9.3505 | 0.1698 | | 21.1747 |
| S9 | Aspheric | −11.8669 | 0.7855 | 1.55, 55.9 | −65.4992 |
| S10 | Aspheric | −1.775 | 0.0400 | | 0.0454 |
| S11 | Aspheric | 3.6761 | 0.3200 | 1.64, 23.5 | 0.2838 |
| S12 | Aspheric | 2.1071 | 2.0750 | | −0.9835 |
| S13 | Aspheric | 4.4001 | 0.4800 | 1.55, 55.9 | 0.0364 |
| S14 | Aspheric | 2.1267 | 0.3889 | | −0.9630 |
| S15 | Spherical | Infinite | 0.2100 | 1.52, 64.2 | |
| S16 | Spherical | Infinite | 0.5369 | | |
| S17 | Spherical | Infinite | | | |

Aspheric parameters in the embodiment are shown in Table 13 and Table 14 below, wherein A4, A6, . . . , A30 respectively represent aspheric coefficients of corresponding orders:

TABLE 13

| Surface number | A4 | A6 | A8 | A10 | A12 | A14 | A16 |
|---|---|---|---|---|---|---|---|
| S2 | 12747E−01 | 2.4733E−02 | −2.4481E−03 | −5.4991E−03 | −2.9288E−03 | −8.6277E−04 | −2.6697E−06 |
| S3 | 2.6199E−01 | −12964E−02 | −8.6025E−03 | −2.2464E−03 | −17531E−05 | 16229E−04 | 2.2053E−05 |
| S4 | 2.4107E−01 | −4.4285E−03 | −5.7256E−03 | −15070E−03 | −6.7368E−05 | −2.5747E−05 | −7.5823E−05 |
| S5 | 5.5667E−03 | 2.8987E−03 | −2.4496E−04 | −4.4901E−04 | −4.1581E−04 | −2.8447E−04 | −2.0662E−04 |
| S6 | −5.5918E−02 | 6.2930E−03 | −9.6550E−04 | −3.5916E−04 | −15652E−04 | −4.3447E−05 | 2.1796E−05 |
| S7 | −10332E−01 | 4.6098E−03 | 2.6698E−04 | −13203E−04 | −3.7863E−06 | −2.8455E−06 | −5.7362E−07 |
| S8 | −8.0750E−02 | 16790E−02 | 3.6694E−03 | 2.0933E−04 | 11595E−04 | 16222E−05 | 13990E−06 |
| S9 | −4.9950E−02 | −2.0951E−03 | 3.6646E−03 | 5.2599E−04 | 3.0301E−04 | 9.8843E−05 | 15889E−05 |
| S10 | 3.6658E−02 | −2.5269E−02 | 4.2274E−04 | −16675E−03 | 3.6236E−04 | −11938E−05 | 17001E−04 |
| S11 | −5.2581E−01 | −10292E−02 | −7.0226E−03 | −18990E−03 | −3.2210E−04 | −14289E−04 | 8.8006E−06 |
| S12 | −9.4265E−01 | 12505E−01 | −2.5513E−02 | 5.6671E−03 | −18873E−03 | 9.3158E−04 | −4.1400E−04 |
| S13 | −3.5307E+00 | 9.3969E−01 | −2.9404E−01 | 5.3120E−02 | −12740E−02 | 3.6471E−03 | −2.0936E−03 |
| S14 | −5.4671E+00 | 9.0875E−01 | −2.0375E−01 | 9.4448E−02 | −4.2458E−02 | 4.2939E−03 | −6.4625E−03 |

TABLE 14

| Surface number | A18 | A20 | A22 | A24 | A26 | A28 | A30 |
|---|---|---|---|---|---|---|---|
| S2 | 10847E−04 | 5.2081E−05 | 0.0000E+00 | 0.0000E+00 | 0.0000E+00 | 0.0000E+00 | 0.0000E+00 |
| S3 | −3.4671E−05 | −8.4790E−06 | 3.2932E−06 | 4.0888E−06 | 4.6027E−06 | 4.6376E−06 | 12319E−06 |
| S4 | −5.7956E−05 | 19668E−06 | 13677E−05 | 10321E−05 | 9.3453E−06 | 6.5038E−06 | 2.3307E−06 |
| S5 | −11553E−04 | −6.8622E−05 | −2.6275E−05 | −16275E−05 | −8.9162E−07 | 3.1328E−07 | 3.6067E−06 |
| S6 | 3.6415E−05 | 3.3424E−05 | 18878E−05 | 10325E−05 | 2.0405E−06 | −3.2962E−07 | −11350E−06 |
| S7 | 0.0000E+00 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 | 0.0000E+00 |
| S10 | 2.6450E−05 | 5.4082E−05 | 12810E−05 | 17918E−05 | 2.4930E−06 | 0.0000E+00 | 0.0000E+00 |
| S11 | −3.0227E−05 | 2.4372E−05 | −8.3191E−06 | 12167E−05 | 0.0000E+00 | 0.0000E+00 | 0.0000E+00 |
| S12 | 2.0587E−04 | −9.8547E−05 | 3.7855E−05 | −16413E−05 | 0.0000E+00 | 0.0000E+00 | 0.0000E+00 |
| S13 | −9.7770E−06 | 3.4534E−04 | 3.2224E−06 | −8.9649E−05 | 6.4154E−05 | −16930E−06 | −16298E−06 |
| S14 | 1.2204E−03 | −5.7974E−04 | 9.9018E−05 | −2.1756E−05 | −5.8080E−05 | 8.2706E−05 | 7.9085E−06 |

Figure 14:
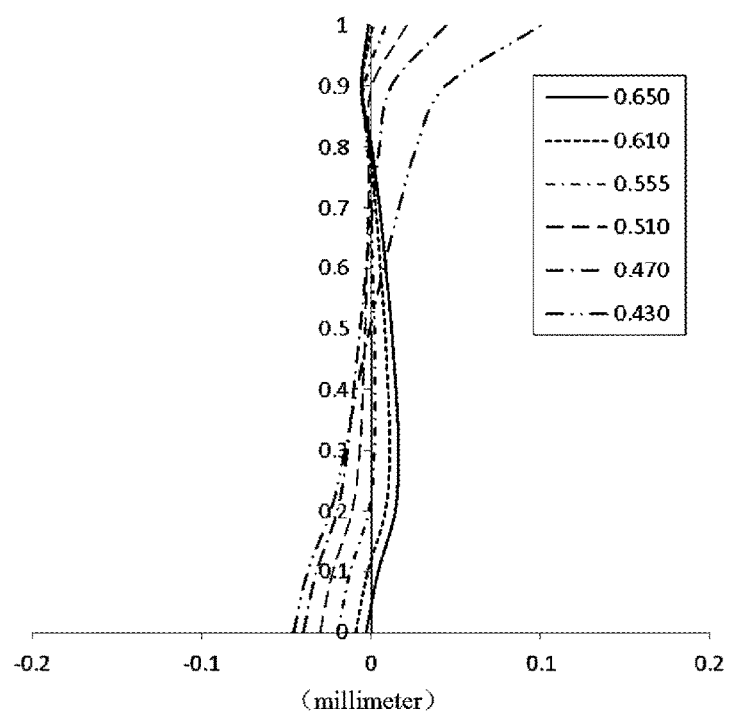
FIG. 14 schematically shows a longitudinal aberration curve diagram of the imaging system according to the fourth embodiment of the disclosure.
Figure 15:
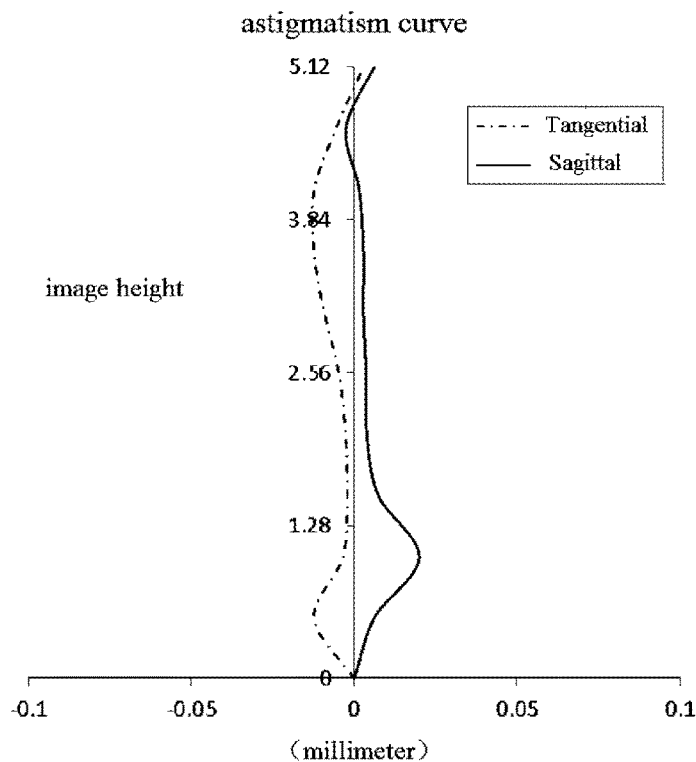
FIG. 15 schematically shows an astigmatism curve diagram of the imaging system according to the fourth embodiment of the disclosure.
Figure 16:
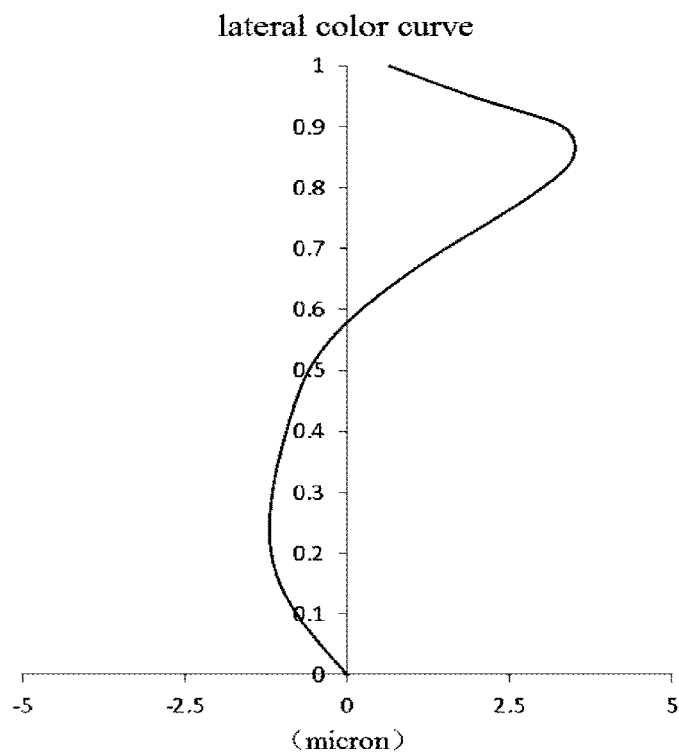
FIG. 16 schematically shows a lateral color curve diagram of the imaging system according to the fourth embodiment of the disclosure.

FIG. 14 schematically shows a longitudinal aberration curve diagram of the imaging system according to the fourth embodiment of the disclosure, which represents deviations of a convergence focal point after lights with different wavelengths pass through the lens; FIG. 15 schematically shows an astigmatism curve diagram of the imaging system according to the fourth embodiment of the disclosure, which represents a tangential image surface curvature and a sagittal image surface curvature; FIG. 16 schematically shows a lateral color curve diagram of the imaging system according to the fourth embodiment of the disclosure, which represents the deviation of different image heights on the imaging surface after the light passes through the lens; and in combination with FIGS. 14-16, it can be seen that the imaging system of the embodiment may realize good imaging quality.

Fifth Embodiment

Figure 17:
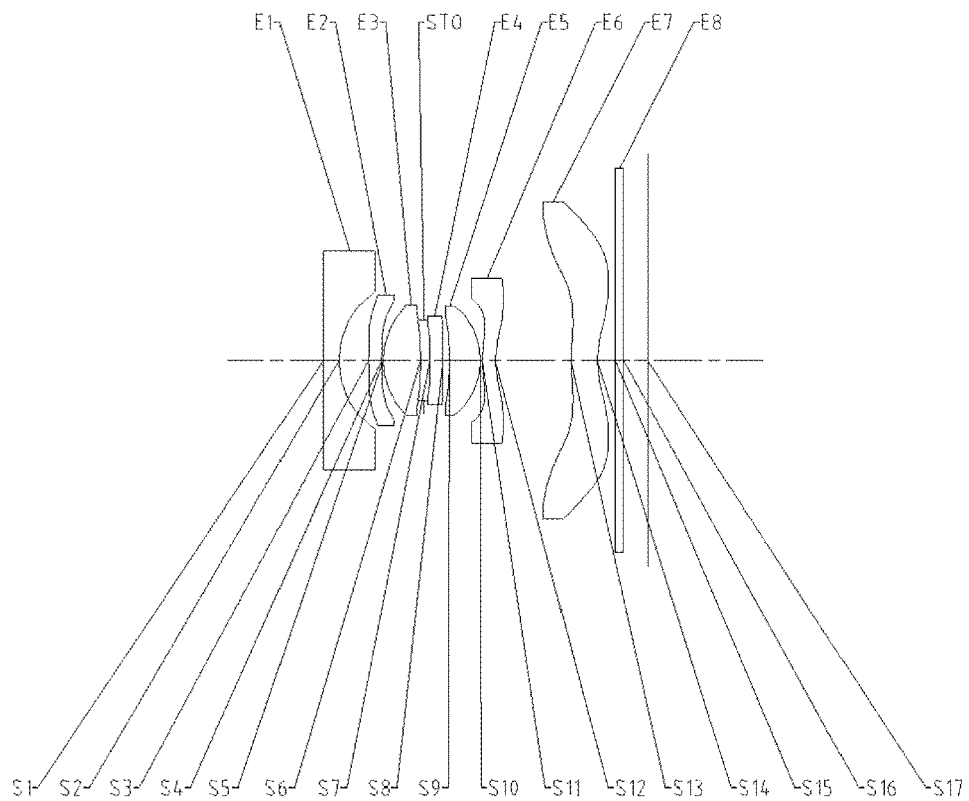
FIG. 17 schematically shows a structural diagram of an imaging system according to a fifth embodiment of the disclosure.

As shown in FIG. 17, in the embodiment, an refractive power of the first lens E1 is negative, an object-side surface S1 thereof is a plane, and an image-side surface S2 thereof is a concave surface; an refractive power of the second lens E2 is negative, an object-side surface S3 thereof is a convex surface, and an image-side surface S4 thereof is a concave surface; an refractive power of the third lens E3 is positive, an object-side surface S5 thereof is a convex surface, and an image-side surface S6 thereof is a convex surface; an refractive power of the fourth lens E4 is negative, an object-side surface S7 thereof is a convex surface, and an image-side surface S8 thereof is a concave surface; an refractive power of the fifth lens E5 is positive, an object-side surface S9 thereof is a concave surface, and an image-side surface S10 thereof is a convex surface; an refractive power of the sixth lens E6 is negative, an object-side surface S11 thereof is a convex surface, and an image-side surface S12 thereof is a concave surface; an refractive power of the seventh lens E7 is negative, an object-side surface S13 thereof is a convex surface, and an image-side surface S14 thereof is a concave surface; and a diaphragm STO is located between the third lens E3 and the fourth lens E4.

Parameters of various optical elements in the imaging system of the embodiment are shown in Table 15 below:

TABLE 15

| Surface number | Surface type | Curvature radius | Thickness | Material | Conic coefficient |
|---|---|---|---|---|---|
| OBJ | Spherical | Infinite | 600.0000 | | |
| S1 | Spherical | Infinite | 0.3800 | 1.49, 70.2 | |
| S2 | Aspheric | 2.2219 | 0.7328 | | −0.5876 |
| S3 | Aspheric | 100.0000 | 0.3200 | 1.68, 19.2 | −99.0000 |
| S4 | Aspheric | 98.0596 | 0.0403 | | 99.0000 |
| S5 | Aspheric | 2.1200 | 0.9255 | 1.55, 55.9 | 0.2911 |
| S6 | Aspheric | −33.7557 | 0.0871 | | 99.0000 |

TABLE 15-continued

| Surface number | Surface type | Curvature radius | Thickness | Material | Conic coefficient |
|---|---|---|---|---|---|
| STO | Spherical | Infinite | 0.1483 | | |
| S7 | Aspheric | 17.4024 | 0.3200 | 1.68, 19.2 | 99.0000 |
| S8 | Aspheric | 13.7408 | 0.1586 | | −12.8957 |
| S9 | Aspheric | −10.8527 | 0.7711 | 1.55, 55.9 | −32.8999 |
| S10 | Aspheric | −1.7186 | 0.0400 | | −0.0022 |
| S11 | Aspheric | 3.0785 | 0.3200 | 1.64, 23.5 | −1.5503 |
| S12 | Aspheric | 1.8627 | 1.8614 | | −1.1055 |
| S13 | Aspheric | 4.2954 | 0.6509 | 1.55, 55.9 | −0.3298 |
| S14 | Aspheric | 2.2764 | 0.4441 | | −0.9365 |
| S15 | Spherical | Infinite | 0.2100 | 1.52, 64.2 | |
| S16 | Spherical | Infinite | 0.5899 | | |
| S17 | Spherical | Infinite | | | |

Aspheric parameters in the embodiment are shown in Table 16 and Table 17 below, wherein A4, A6, ..., A30 respectively represent aspheric coefficients of corresponding orders:

TABLE 16

| Surface number | A4 | A6 | A8 | A10 | A12 | A14 | A16 |
|---|---|---|---|---|---|---|---|
| S2 | 1.6489E−01 | 2.6263E−02 | −5.0164E−03 | −7.3316E−03 | −3.6211E−03 | −7.0512E−04 | 2.3239E−04 |
| S3 | 2.4874E−01 | −9.1950E−03 | −1.6614E−02 | −4.9106E−03 | −3.2716E−04 | 6.7383E−04 | 2.4295E−04 |
| S4 | 3.0792E−01 | −5.6334E−03 | −6.5130E−03 | −5.0368E−03 | 1.2557E−04 | −3.6223E−06 | 1.5621E−04 |
| S5 | 4.9825E−02 | −1.2146E−02 | 7.3069E−04 | −2.7831E−03 | −3.7845E−04 | −6.6519E−04 | −1.9709E−04 |
| S6 | −6.7678E−02 | 5.5502E−03 | −8.6784E−04 | −3.0785E−04 | −1.1241E−04 | −6.4664E−05 | −2.2736E−05 |
| S7 | −9.7251E−02 | 5.3008E−03 | 1.7363E−04 | −1.3934E−04 | −1.2246E−05 | −3.2981E−06 | −2.8984E−06 |
| S8 | −8.2347E−02 | 1.5804E−02 | 2.6088E−03 | −1.2568E−04 | 6.1939E−05 | 1.3399E−05 | −1.1744E−06 |
| S9 | −4.2797E−02 | −3.7267E−04 | 4.1338E−03 | −3.5948E−05 | 3.1192E−04 | 1.0654E−04 | 7.2411E−06 |
| S10 | 4.5376E−02 | −2.6495E−02 | 1.4911E−03 | −2.1901E−03 | 3.0039E−04 | −1.5414E−04 | 1.3299E−04 |
| S11 | −5.6098E−01 | −8.9976E−03 | −6.8508E−03 | −2.9525E−03 | −5.5533E−04 | −3.7029E−04 | 1.4988E−05 |
| S12 | −1.0268E+00 | 1.4913E−01 | −2.9363E−02 | 5.8129E−03 | −1.9845E−03 | 1.1015E−03 | −4.6505E−04 |
| S13 | −3.3802E+00 | 9.0429E−01 | −2.6362E−01 | 4.5740E−02 | −7.9709E−04 | 7.1889E−03 | −2.0767E−03 |
| S14 | −5.6081E+00 | 8.3680E−01 | −1.8041E−01 | 8.6873E−02 | −3.3163E−02 | 1.4761E−02 | 8.4851E−03 |

TABLE 17

| Surface number | A18 | A20 | A22 | A24 | A26 | A28 | A30 |
|---|---|---|---|---|---|---|---|
| S2 | 2.6665E−04 | 7.3937E−05 | 0.0000E+00 | 0.0000E+00 | 0.0000E+00 | 0.0000E+00 | 0.0000E+00 |
| S3 | 2.5112E−06 | −6.8985E−05 | −16205E−05 | −14340E−06 | 15142E−05 | 7.9964E−06 | 8.1489E−06 |
| S4 | −13528E−04 | −4.9369E−05 | −2.4214E−05 | 8.2446E−06 | 10037E−05 | 5.8755E−06 | 3.7452E−06 |
| S5 | −19152E−04 | −9.4444E−05 | −6.1278E−05 | −3.9238E−05 | −14070E−05 | −11044E−05 | 4.0133E−07 |
| S6 | −14477E−05 | 2.3730E−06 | −11090E−07 | 4.3773E−06 | 9.2671E−07 | 2.1621E−06 | −9.6718E−07 |
| S7 | 0.0000E+00 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 | 0.0000E+00 |
| S10 | −10608E−05 | 3.6304E−05 | 5.0318E−06 | 11316E−05 | 3.3207E−06 | 0.0000E+00 | 0.0000E+00 |
| S11 | −5.2448E−05 | 4.8407E−05 | −15451E−06 | 18172E−05 | 0.0000E+00 | 0.0000E+00 | 0.0000E+00 |
| S12 | 2.2006E−04 | −10971E−04 | 4.2321E−05 | −17946E−05 | 0.0000E+00 | 0.0000E+00 | 0.0000E+00 |
| S13 | −2.2368E−04 | 5.2384E−04 | −5.4848E−04 | −7.6601E−05 | 5.5948E−05 | 11857E−05 | 3.3101E−05 |
| S14 | 10407E−02 | 5.3695E−03 | 2.5272E−03 | 9.4422E−04 | 2.5830E−04 | 2.6921E−04 | 5.8933E−05 |

Figure 18:
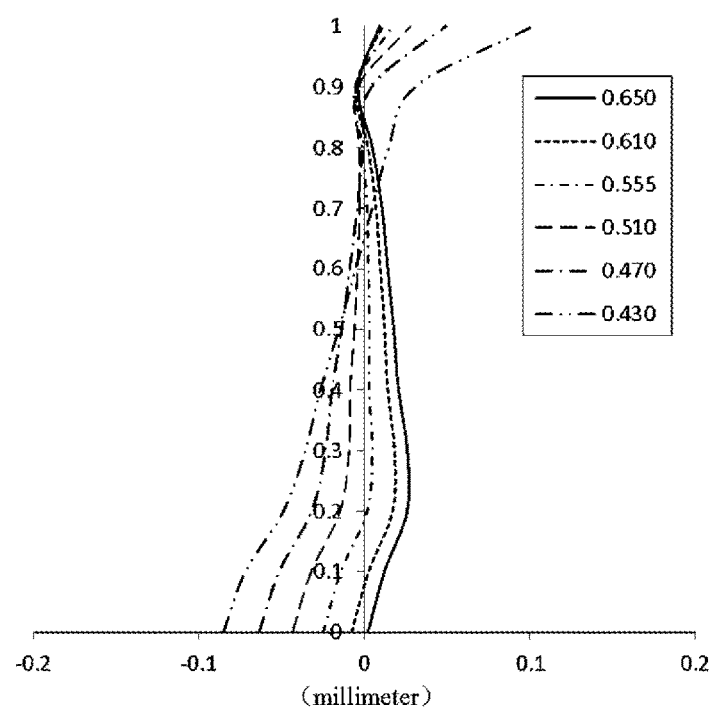
FIG. 18 schematically shows a longitudinal aberration curve diagram of the imaging system according to the fifth embodiment of the disclosure.
Figure 19:
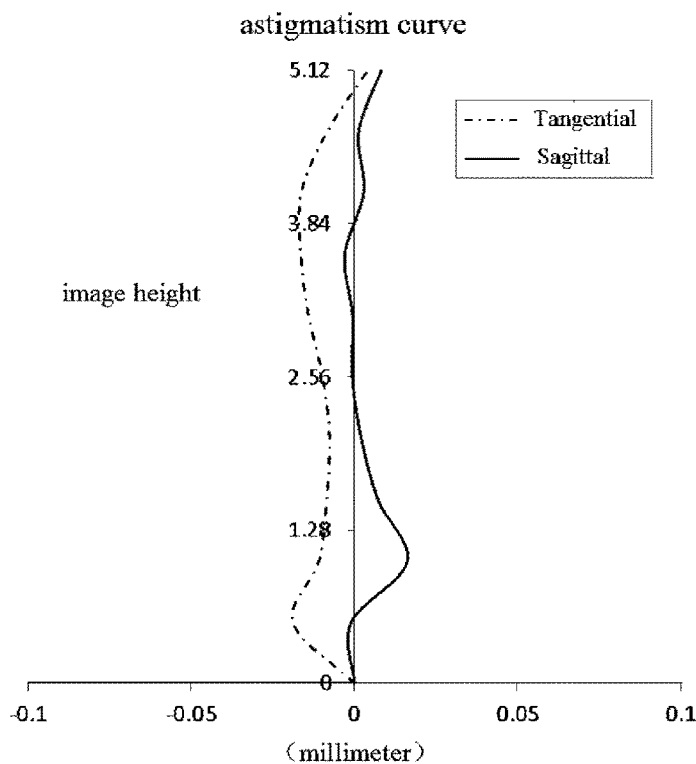
FIG. 19 schematically shows an astigmatism curve diagram of the imaging system according to the fifth embodiment of the disclosure.
Figure 20:
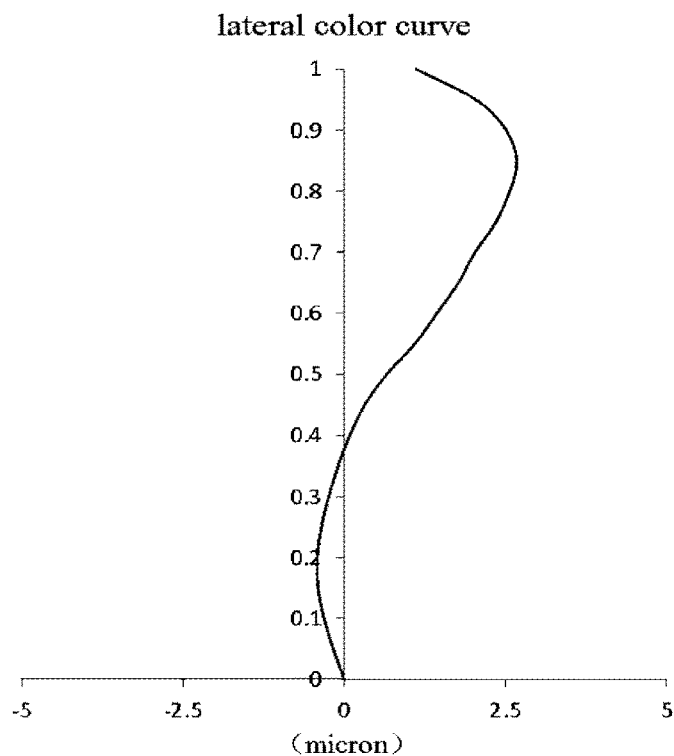
FIG. 20 schematically shows a lateral color curve diagram of the imaging system according to the fifth embodiment of the disclosure.

FIG. 18 schematically shows a longitudinal aberration curve diagram of the imaging system according to the fifth embodiment of the disclosure, which represents deviations of a convergence focal point after lights with different wavelengths pass through the lens; FIG. 19 schematically shows an astigmatism curve diagram of the imaging system according to the fifth embodiment of the disclosure, which represents a tangential image surface curvature and a sagittal image surface curvature; FIG. 20 schematically shows a lateral color curve diagram of the imaging system according to the first embodiment of the disclosure, which represents the deviation of different image heights on the imaging surface after the light passes through the lens; and in combination with FIGS. 18-20, it can be seen that the imaging system of the embodiment may realize good imaging quality.

Sixth Embodiment

Figure 21:
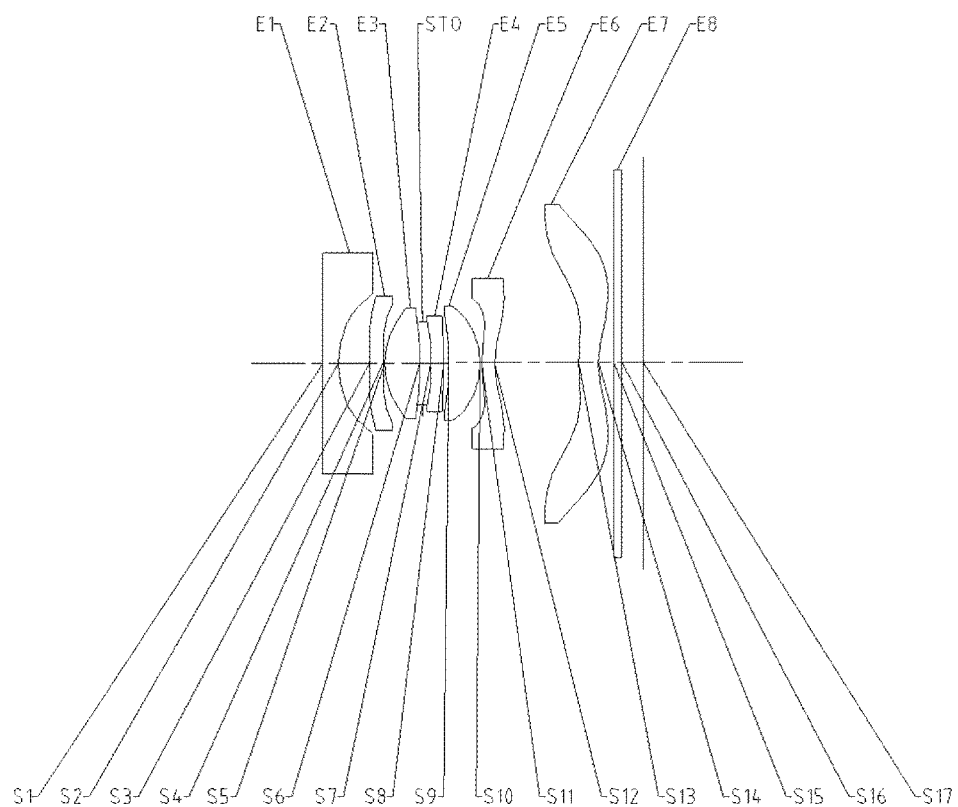
FIG. 21 schematically shows a structural diagram of an imaging system according to a sixth embodiment of the disclosure.

As shown in FIG. 21, in the embodiment, an refractive power of the first lens E1 is negative, an object-side surface S1 thereof is a plane, and an image-side surface S2 thereof is a concave surface; an refractive power of the second lens E2 is negative, an object-side surface S3 thereof is a concave surface, and an image-side surface S4 thereof is a concave surface; an refractive power of the third lens E3 is positive, an object-side surface S5 thereof is a convex surface, and an image-side surface S6 thereof is a convex surface; an refractive power of the fourth lens E4 is negative, an object-side surface S7 thereof is a concave surface, and an image-side surface S8 thereof is a concave surface; an refractive power of the fifth lens E5 is positive, an object-side surface S9 thereof is a concave surface, and an image-side surface S10 thereof is a convex surface; an refractive power of the sixth lens E6 is negative, an object-side surface S11 thereof is a convex surface, and an image-side surface S12 thereof is a concave surface; an refractive power of the seventh lens E7 is negative, an object-side surface S13 thereof is a convex surface, and an image-side surface S14 thereof is a concave surface; and a diaphragm STO is located between the third lens E3 and the fourth lens E4.

Parameters of various optical elements in the imaging system of the embodiment are shown in Table 18 below:

TABLE 18

| Surface number | Surface type | Curvature radius | Thickness | Material | Conic coefficient |
|---|---|---|---|---|---|
| OBJ | Spherical | Infinite | 600.0000 | | |
| S1 | Spherical | Infinite | 0.3800 | 1.49, 70.2 | |
| S2 | Aspheric | 2.5279 | 0.7850 | | −0.1802 |
| S3 | Aspheric | −22.1611 | 0.3373 | 1.68, 19.2 | 50.3116 |
| S4 | Aspheric | 100.0000 | 0.0400 | | −32.5519 |
| S5 | Aspheric | 1.9709 | 0.8768 | 1.55, 55.9 | −0.0326 |
| S6 | Aspheric | −20.6793 | 0.0633 | | −99.0000 |
| STO | Spherical | Infinite | 0.2156 | | |
| S7 | Aspheric | −100.0000 | 0.3200 | 1.68, 19.2 | −99.0000 |
| S8 | Aspheric | 27.6047 | 0.1223 | | 28.6247 |
| S9 | Aspheric | −11.5999 | 0.7849 | 1.55, 55.9 | 20.2938 |
| S10 | Aspheric | −1.7521 | 0.0400 | | −0.0501 |
| S11 | Aspheric | 3.2108 | 0.3200 | 1.64, 23.5 | −0.3627 |
| S12 | Aspheric | 1.9474 | 2.1027 | | −1.0246 |
| S13 | Aspheric | 4.4975 | 0.4862 | 1.55, 55.9 | −0.1029 |
| S14 | Aspheric | 2.1533 | 0.3851 | | −0.9566 |
| S15 | Spherical | Infinite | 0.2100 | 1.52, 64.2 | |
| S16 | Spherical | Infinite | 0.5308 | | |
| S17 | Spherical | Infinite | | | |

Aspheric parameters in the embodiment are shown in Table 19 and Table 20 below, wherein A4, A6, . . . , A30 respectively represent aspheric coefficients of corresponding orders:

TABLE 19

| Surface number | A4 | A6 | A8 | A10 | A12 | A14 | A16 |
|---|---|---|---|---|---|---|---|
| S2 | 19101E−01 | 2.4733E−02 | −7.7742E−03 | −8.3835E−03 | −3.6940E−03 | −7.9892E−04 | 17549E−04 |
| S3 | 2.6199E−01 | −2.0089E−02 | −12352E−02 | −3.1746E−03 | −17531E−05 | 3.0440E−04 | 6.7285E−05 |
| S4 | 2.4842E−01 | −5.6456E−03 | −8.4873E−03 | −2.5608E−03 | −3.9837E−04 | −2.5747E−05 | −10200E−04 |
| S8 | −8.6378E−02 | 2.3092E−02 | 3.6694E−03 | −11668E−05 | 11595E−04 | 15884E−05 | −9.8858E−07 |
| S9 | −4.9950E−02 | 6.2110E−03 | 6.8051E−03 | 5.2599E−04 | 6.0715E−04 | 14439E−04 | 15889E−05 |
| S10 | 5.9536E−02 | −2.6312E−02 | 2.3991E−03 | −2.1367E−03 | 3.4875E−04 | −2.4904E−04 | 10674E−04 |
| S11 | −5.4980E−01 | −10292E−02 | −7.5678E−03 | −3.3871E−03 | −5.3599E−04 | −3.9756E−04 | 5.7865E−05 |
| S12 | −9.5315E−01 | 12936E−01 | −2.6470E−02 | 5.7486E−03 | −18873E−03 | 9.9767E−04 | −4.6213E−04 |
| S13 | −3.4054E+00 | 9.7811E−01 | −2.9404E−01 | 5.3120E−02 | −9.5989E−03 | 5.0946E−03 | −2.5846E−03 |
| S14 | −5.4800E+00 | 9.2254E−01 | −2.0075E−01 | 8.6896E−02 | −4.2702E−02 | 5.7680E−03 | −4.2213E−03 |

TABLE 20

| Surface number | A18 | A20 | A22 | A24 | A26 | A28 | A30 |
|---|---|---|---|---|---|---|---|
| S2 | 2.0825E−04 | 7.9951E−05 | 0.0000E+00 | 0.0000E+00 | 0.0000E+00 | 0.0000E+00 | 0.0000E+00 |
| S3 | −3.4671E−05 | −2.3229E−05 | 3.2932E−06 | 4.3386E−06 | 3.1186E−06 | 2.7808E−06 | 10250E−06 |
| S4 | −3.5270E−05 | 5.8462E−06 | 3.9613E−05 | 17331E−05 | 16066E−05 | 6.5897E−06 | 4.4773E−06 |
| S5 | −14295E−04 | −8.8385E−05 | −2.6275E−05 | −19180E−05 | 10795E−06 | 17847E−07 | 4.3895E−06 |
| S6 | 3.7149E−06 | 12384E−05 | 6.7717E−06 | 6.6488E−06 | −2.0951E−07 | 2.6747E−08 | −11350E−06 |
| S7 | 0.0000E+00 | 0.0000E+00 | 0.0000E+00 | 0.0000E+00 | 0.0000E+00 | 0.0000E+00 | 0.0000E+00 |
| 58 | 0.0000E+00 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 | 0.0000E+00 |
| S10 | −4.7522E−05 | 2.8271E−05 | −3.3534E−06 | 8.6373E−06 | 2.4930E−06 | 0.0000E+00 | 0.0000E+00 |
| S11 | −5.8904E−05 | 5.3749E−05 | −14225E−05 | 13411E−05 | 0.0000E+00 | 0.0000E+00 | 0.0000E+00 |
| S12 | 2.0413E−04 | −9.4891E−05 | 3.7855E−05 | −8.6772E−06 | 0.0000E+00 | 0.0000E+00 | 0.0000E+00 |
| S13 | −9.7770E−06 | 5.1365E−04 | −16786E−04 | −8.9649E−05 | 9.1550E−05 | −4.2114E−05 | 8.2392E−06 |
| S14 | 2.0141E−03 | 2.2096E−05 | 12438E−04 | −6.9283E−05 | −2.4318E−04 | 3.3657E−05 | −16728E−05 |

Figure 22:
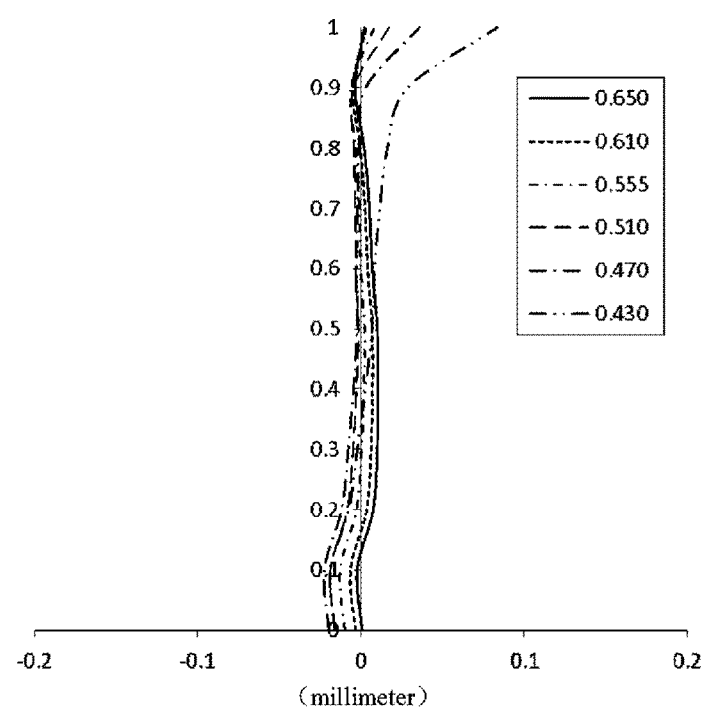
FIG. 22 schematically shows a longitudinal aberration curve diagram of the imaging system according to the sixth embodiment of the disclosure.
Figure 23:
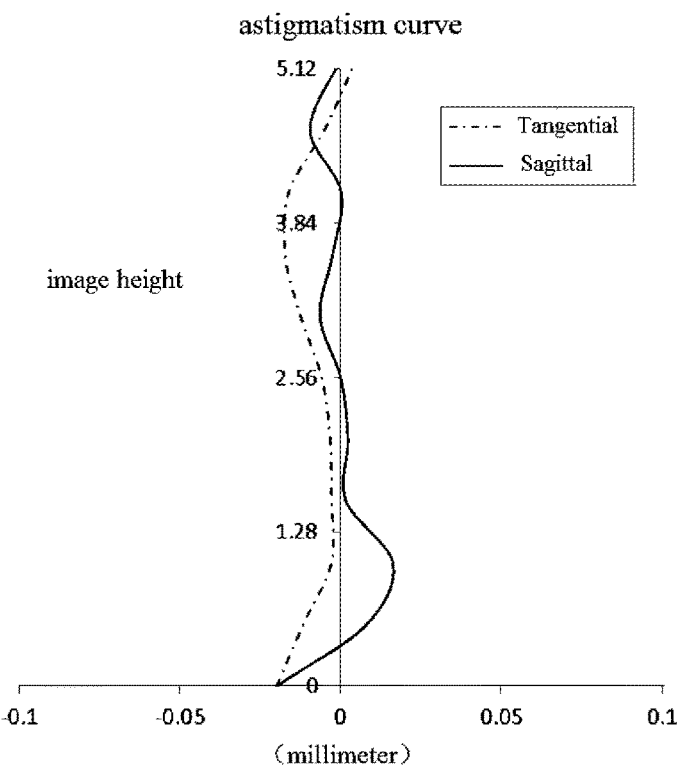
FIG. 23 schematically shows an astigmatism diagram of the imaging system according to the sixth embodiment of the disclosure.
Figure 24:
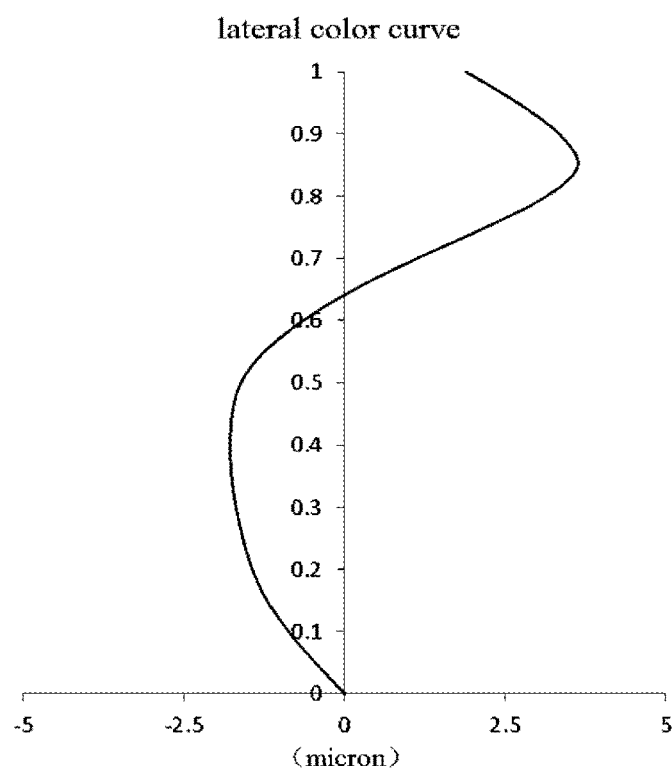
FIG. 24 schematically shows a lateral color curve diagram of the imaging system according to the sixth embodiment of the disclosure.

FIG. 22 schematically shows a longitudinal aberration curve diagram of the imaging system according to the sixth embodiment of the disclosure, which represents deviations of a convergence focal point after lights with different wavelengths pass through the lens; FIG. 23 schematically shows an astigmatism curve diagram of the imaging system according to the sixth embodiment of the disclosure, which represents a tangential image surface curvature and a sagittal image surface curvature; FIG. 24 schematically shows a lateral color curve diagram of the imaging system according to the sixth embodiment of the disclosure, which represents the deviation of different image heights on the imaging surface after the light passes through the lens; and in combination with FIGS. 22-24, it can be seen that the imaging system of the embodiment may realize good imaging quality.

The foregoing descriptions are merely specific embodiments of the disclosure, and are not intended to limit the disclosure. For those skilled in the art, the disclosure can have various modifications and changes. Any modifications, equivalent replacements, improvements and the like, made within the spirit and principle of the disclosure, shall be included within the protection scope of the disclosure.

What is claimed is:

1. An imaging system, comprising a first lens, a second lens, a third lens, a diaphragm, a fourth lens, a fifth lens, a sixth lens and a seventh lens arranged in sequence from an object side to an image side along an optical axis, the first lens, the second lens, the third lens and the sixth lens all have refractive powers, wherein the fourth lens has a negative refractive power, the fifth lens has a positive refractive power, the seventh lens has a negative refractive power, and Semi-FOV is a half of a maximum field of view of the imaging system, and Semi-FOV satisfies: Semi-FOV>70°.

2. The imaging system according to claim 1, wherein an object-side surface of the fifth lens is a concave surface.

3. The imaging system according to claim 1, wherein the object-side surface of the first lens is a plane, and a material of the first lens is glass.

4. The imaging system according to claim 1, wherein a lens material in the imaging system comprises glass and plastic.

5. The imaging system according to claim 1, wherein TTL is an on-axis distance between an object-side surface of the first lens and an imaging surface, ImgH is a half of a diagonal length of an effective pixel region on the imaging surface, and TTL and ImgH satisfy: TTL/ImgH<1.6.

6. The imaging system according to claim 1, wherein an effective focal length f of the imaging system and an entrance pupil diameter (EPD) of the imaging system satisfy: f/EPD<2.5.

7. The imaging system according to claim 1, wherein ImgH is a half of a diagonal length of an effective pixel region on an imaging surface satisfies: ImgH≥5.0 mm.

8. The imaging system according to claim 1, wherein an effective focal length f1 of the first lens and a curvature radius R2 of an image-side surface of the first lens satisfy: −2.5<f1/R2<−1.5.

9. The imaging system according to claim 1, wherein an effective focal length f3 of the third lens and a curvature radius R5 of an object-side surface of the third lens satisfy: 1.5<f3/R5<2.0.

10. The imaging system according to claim 1, wherein an effective focal length f5 of the fifth lens and a curvature radius R9 of an object-side surface of the fifth lens satisfy: −3.5<R9/f5<−2.0.

11. The imaging system according to claim 1, wherein an effective focal length F of the seventh lens and a curvature radius R13 of an object-side surface of the seventh lens satisfy: −3.0<f7/R13<−1.5.

12. The imaging system according to claim 1, wherein a curvature radius R8 of an image-side surface of the fourth lens, a curvature radius R11 of an object-side surface of the sixth lens and a curvature radius R14 of an image-side surface of the seventh lens satisfy: 1.5<R8/(R11+R14)<5.5.

13. The imaging system according to claim 1, wherein a curvature radius R10 of an image-side surface of the fifth lens and a curvature radius R12 of an image-side surface of the sixth lens satisfy: −1.5<R12/R10<−0.5.

14. The imaging system according to claim 1, wherein $\Sigma CT$ is a sum of center thicknesses of all lenses on the optical axis, $\Sigma CT$ and an air space T67 of the sixth lens and the seventh lens on the optical axis satisfy: $1.5<\Sigma CT/T67<2.0$.

15. The imaging system according to claim 1, wherein TTL is an on-axis distance between an object-side surface of the first lens and an imaging surface, $\Sigma AT$ is a sum of air spaces between the first lens and any two adjacent lenses with refractive powers in the lenses closest to the imaging surface on the optical axis, and TTL and $\Sigma AT$ satisfy: $2.0<TTL/\Sigma AT<2.5$.

16. The imaging system according to claim 1, wherein a refractive index N1 of the first lens satisfies: N1<1.5.

17. The imaging system according to claim 1, wherein an Abbe number V1 of the first lens satisfies: 60<V1<71.

18. The imaging system according to claim 1, wherein an Abbe number V1 of the first lens and an Abbe number V2 of the second lens satisfy: V1−V2<52.

* * * * *